US006912759B2

United States Patent
Izadnegahdar et al.

(10) Patent No.: US 6,912,759 B2
(45) Date of Patent: Jul. 5, 2005

(54) METHOD OF MANUFACTURING A THIN PIEZO RESISTIVE PRESSURE SENSOR

(75) Inventors: Alain Izadnegahdar, Orange Village, OH (US); James Siekkinen, Bay Village, OH (US); Horacio V. Estrada, Beachwood, OH (US); Brad Boggs, Mentor, OH (US); Michael Nagy, Lakewood, OH (US); Kevin Stark, Richmond Heights, OH (US)

(73) Assignee: Rosemount Aerospace Inc., Burnsville, MN (US)

( * ) Notice: Subject to any disclaimer, the term of this patent is extended or adjusted under 35 U.S.C. 154(b) by 399 days.

(21) Appl. No.: 09/909,847

(22) Filed: Jul. 20, 2001

(65) Prior Publication Data

US 2003/0029245 A1 Feb. 13, 2003

(51) Int. Cl.⁷ .............................................. H04R 17/00
(52) U.S. Cl. ...................... 29/25.35; 29/610.1; 216/56; 216/99; 438/53; 438/330; 438/381
(58) Field of Search ............................ 29/25.35, 610.1, 29/852, DIG. 16; 216/2, 41, 56, 99; 438/53, 330, 381, 948

(56) References Cited

U.S. PATENT DOCUMENTS

| 4,023,562 | A | | 5/1977 | Hynecek et al. |
| 4,530,734 | A | * | 7/1985 | Klima ...................... 216/99 X |
| 4,882,933 | A | | 11/1989 | Petersen et al. |
| 5,231,301 | A | | 7/1993 | Peterson et al. |
| 5,355,712 | A | | 10/1994 | Petersen et al. |
| 5,461,922 | A | | 10/1995 | Koen |
| 5,632,854 | A | * | 5/1997 | Mirza et al. .................. 438/53 |
| 5,706,565 | A | | 1/1998 | Sparks et al. |
| 5,902,248 | A | | 5/1999 | Millar et al. |
| 5,905,044 | A | * | 5/1999 | Lee et al. .................... 216/2 X |
| 6,001,666 | A | | 12/1999 | Diem et al. |
| 6,019,729 | A | | 2/2000 | Itoigawa et al. |
| 6,038,928 | A | | 3/2000 | Maluf et al. |
| 6,084,257 | A | | 7/2000 | Petersen et al. |
| 6,106,476 | A | | 8/2000 | Corl et al. |
| 6,140,143 | A | | 10/2000 | Christel et al. |
| 6,167,763 | B1 | | 1/2001 | Tenerz et al. |
| 6,316,796 | B1 | | 11/2001 | Petersen et al. |
| 6,444,487 | B1 | | 9/2002 | Boggs et al. |

FOREIGN PATENT DOCUMENTS

| JP | 2-36576 | * | 2/1990 | ................ 29/25.35 |

OTHER PUBLICATIONS

Chung et al, "Novel High–Performance Pressure Sensors Using Double SOI Structures", Solid State Sensors and Actuators, 1991, Digest of Technical Papers, 1991 International Conference on Transducers, Jun. 1991, pp. 676–681.*
Pak et al, "A New Mthod of Forming a Thin Single–Crystal Silicon Diaphragm using Merged Epitaxial Lateral Overgrowth Senso Appications", IEEE Electron Device Letters, Nove. 1991, pp. 614–616.*

(Continued)

Primary Examiner—A. Dexter Tugbang
(74) Attorney, Agent, or Firm—Thompson Hine LLP

(57) ABSTRACT

A method for forming a sensor including the steps of providing a base wafer and forming a sensor cavity in the base wafer. The method further includes the step of coupling a diaphragm wafer to the base wafer, the diaphragm wafer including a diaphragm portion and a sacrificial portion. The diaphragm wafer is coupled to the base wafer such the diaphragm portion generally covers the sensor cavity. The method further includes the steps of reducing the thickness of the diaphragm wafer by removing the sacrificial portion, and forming or locating at least one piezo resistive portion on the diaphragm portion.

32 Claims, 18 Drawing Sheets

OTHER PUBLICATIONS

Kaneko, S. et al., "Monolithic Fabrication of Flexible Film and Thinned Integrated Circuits," Proceedings IEEE 10th Annual Workshop on MEMS, 1997.

Petersen, K. et al., "Surface Micromachined Structures Fabricated with Silicon Fusion Bonding," 1991 IEEE, pp. 397–399 (May 1991).

Petersen, K. et al., "Silicon Fusion Bonding for Pressure Sensors," 1988 IEEE, pp. 144–147 (Apr. 1988).

E. Kälvesten, The First Surface Micromachined Pressure Sensor for Cardivascular Pressure Measurements, IEEE, pp. 574–579 (1998).

Hin–Leung Chau, An Ultraminiature Solid–State Pressure Sensor for a Cardiovascular Catheter, IEEE Transactions on Electron Devices, vol. 35, No. 12, pp. 2355–2362 (1988).

* cited by examiner

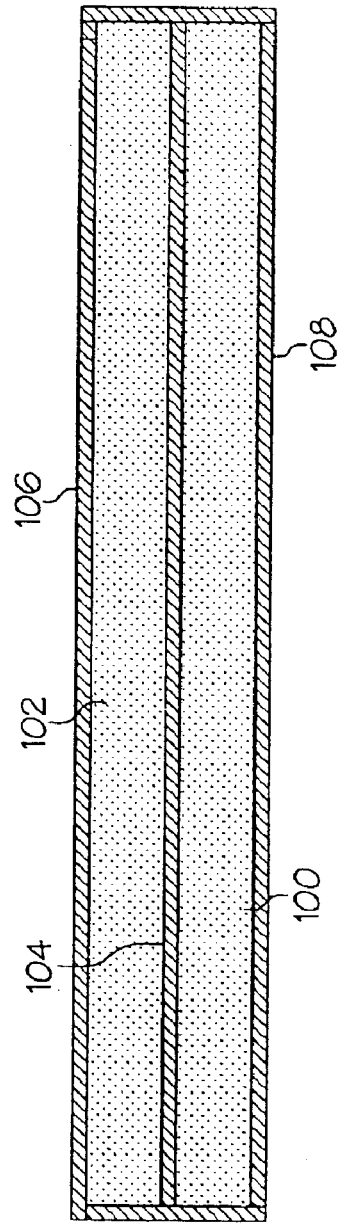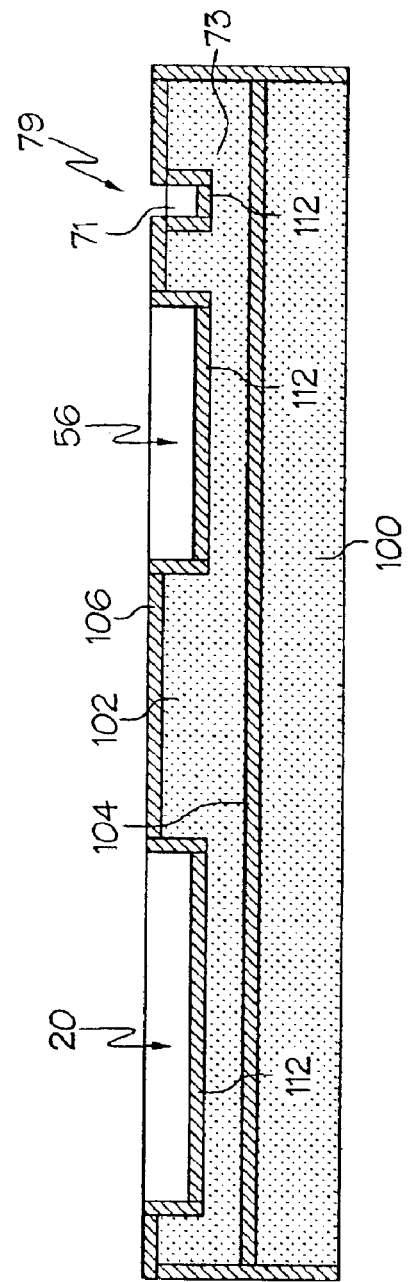

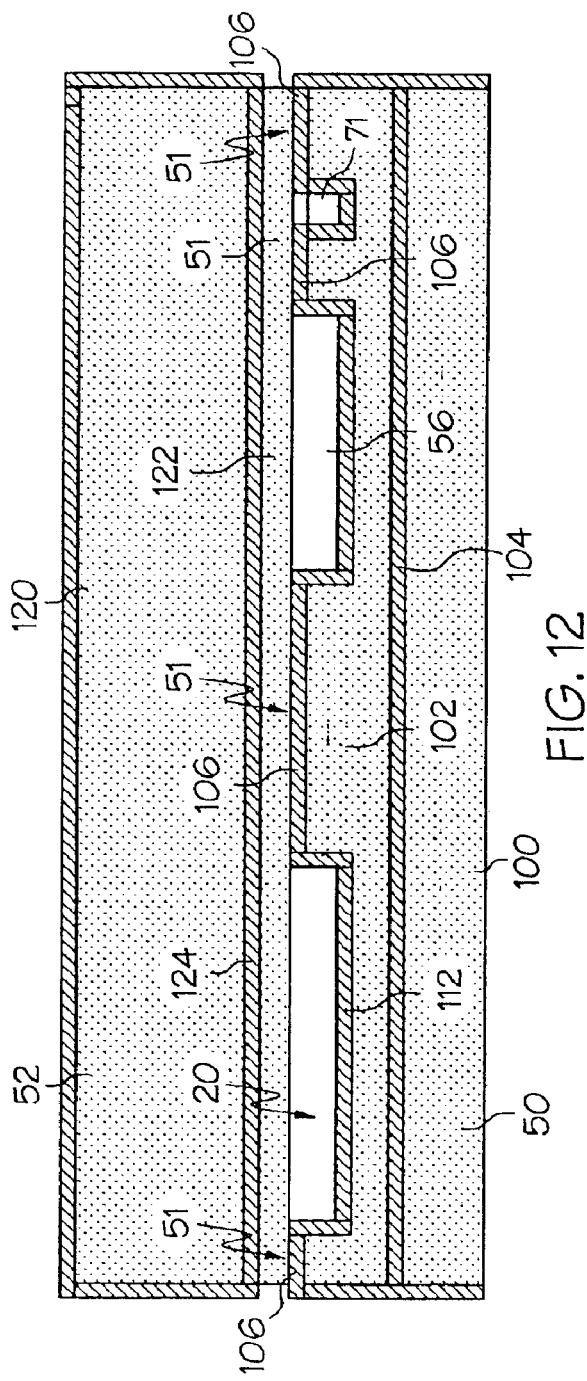
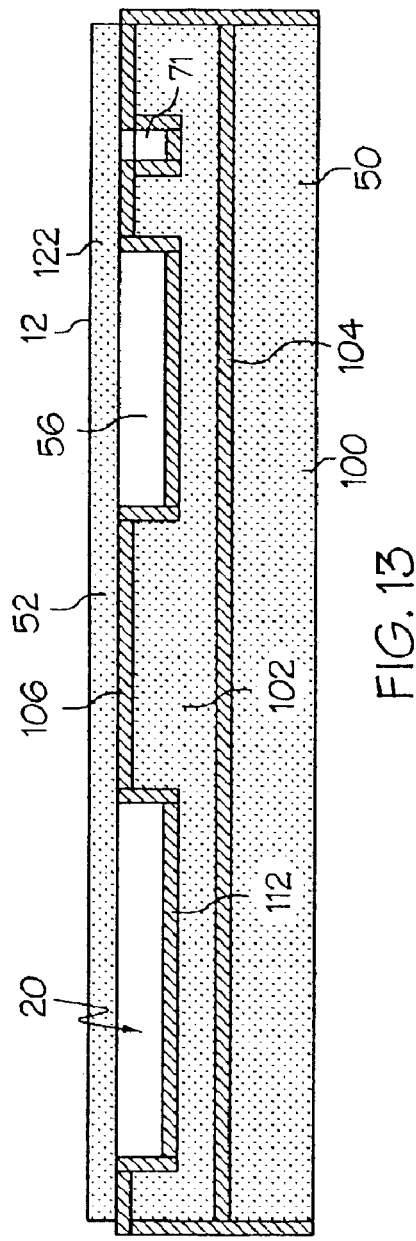
FIG. 12
FIG. 13

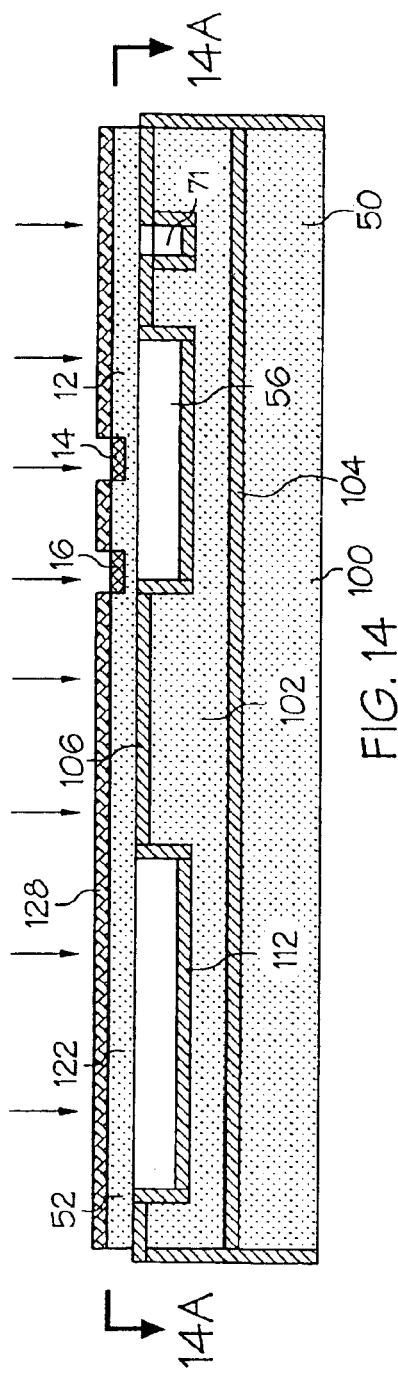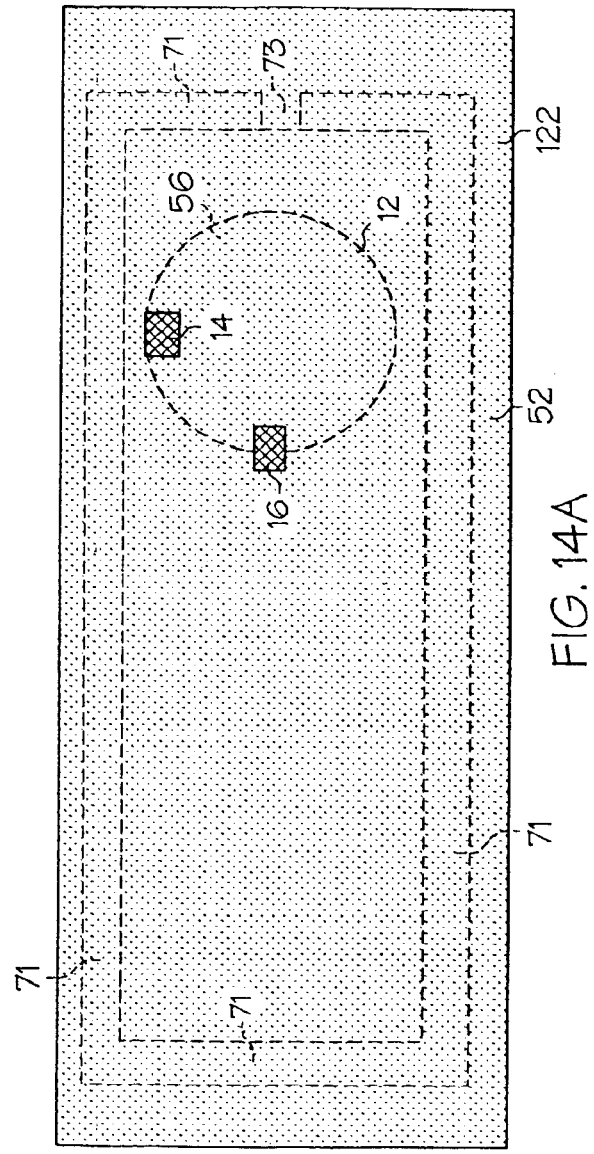

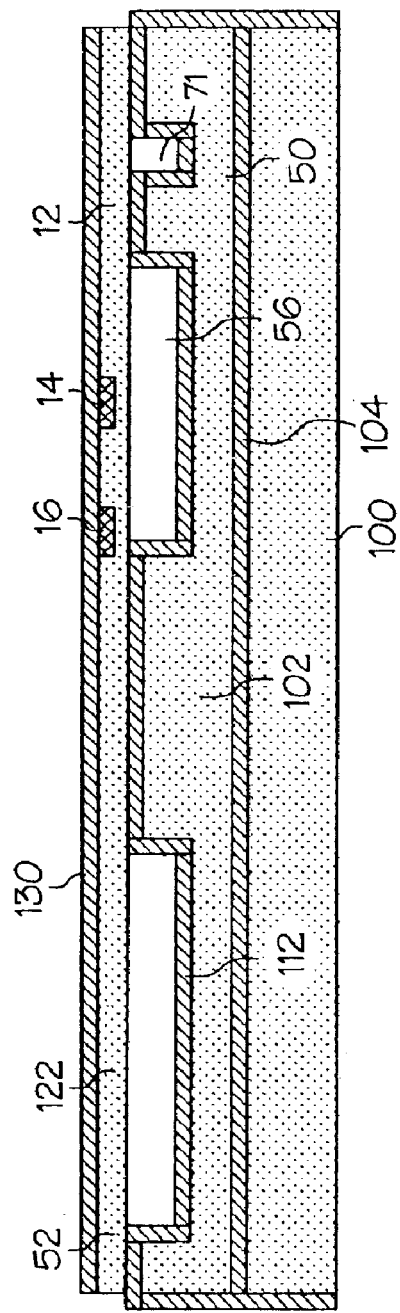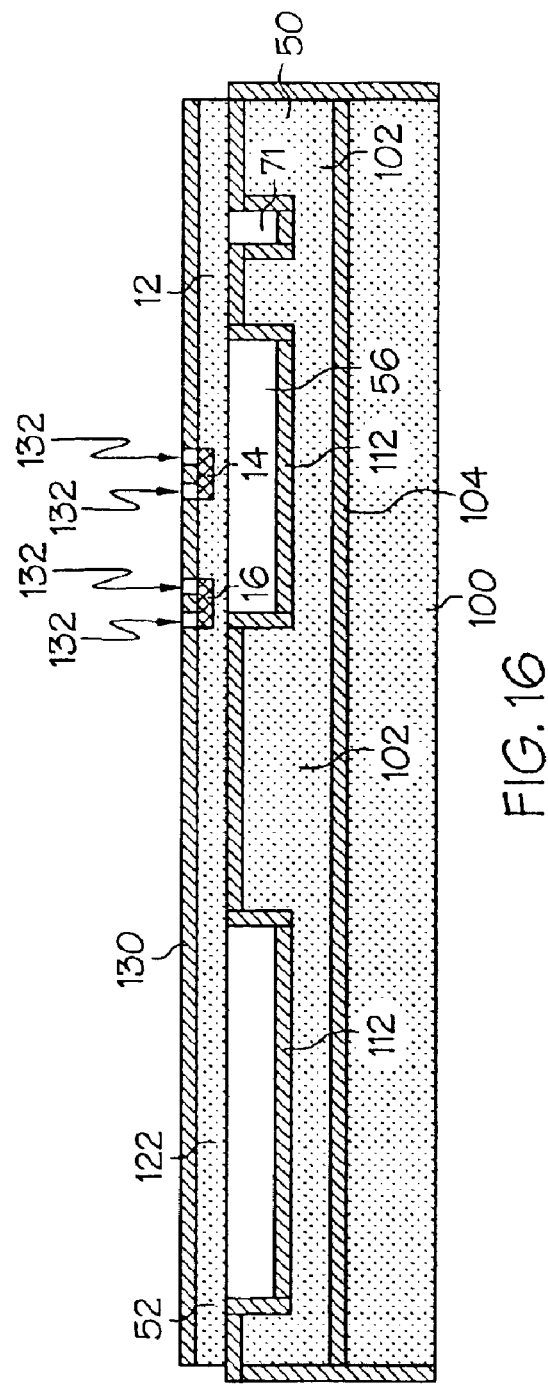

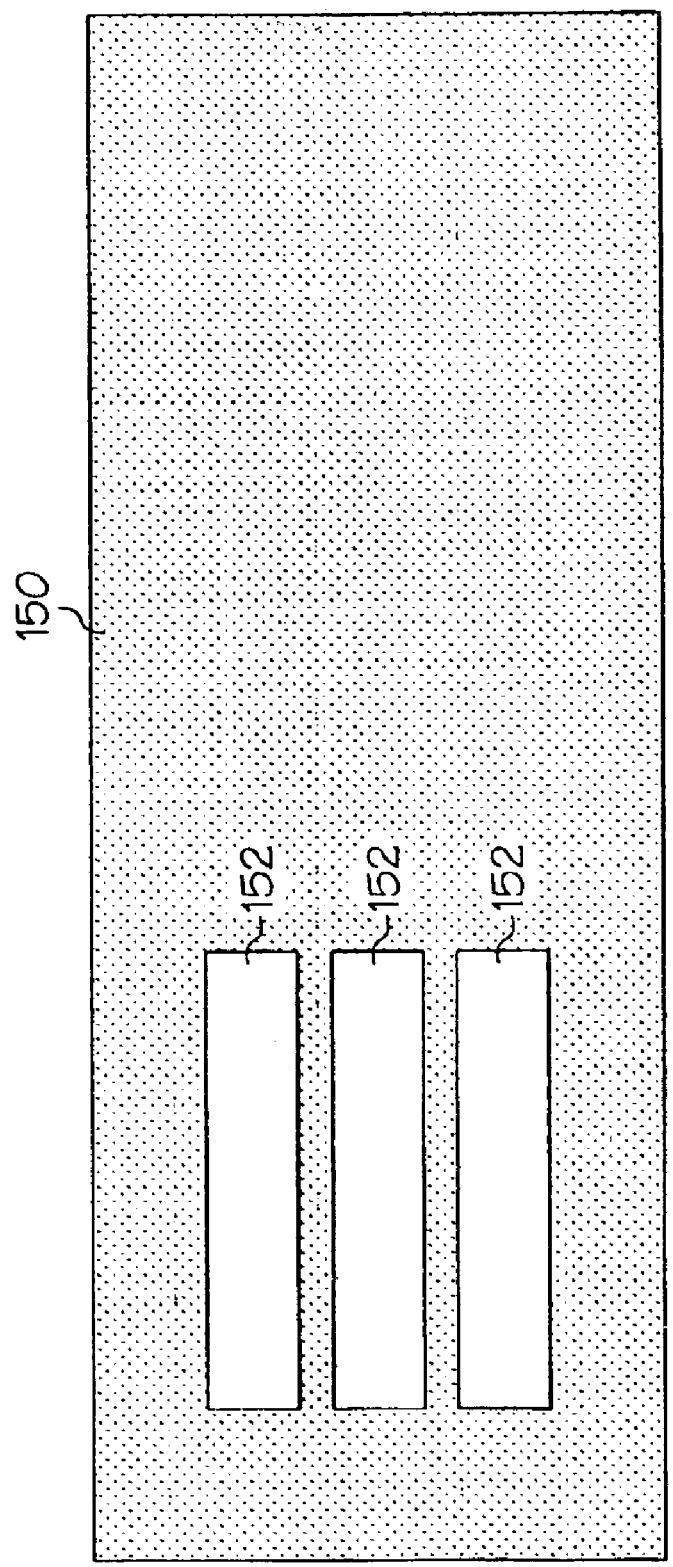

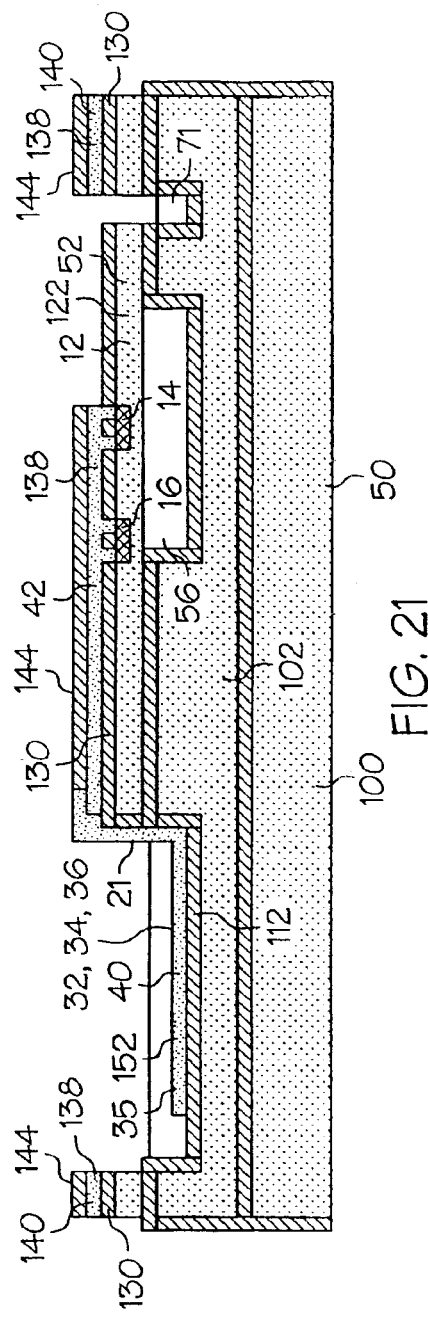
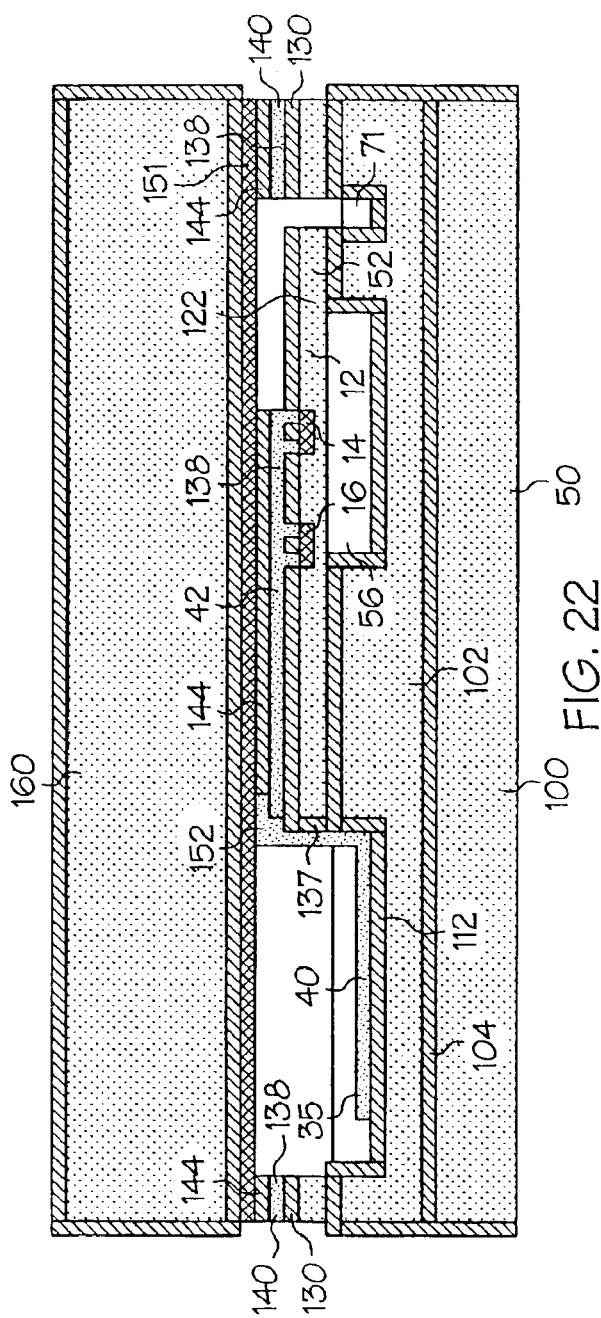

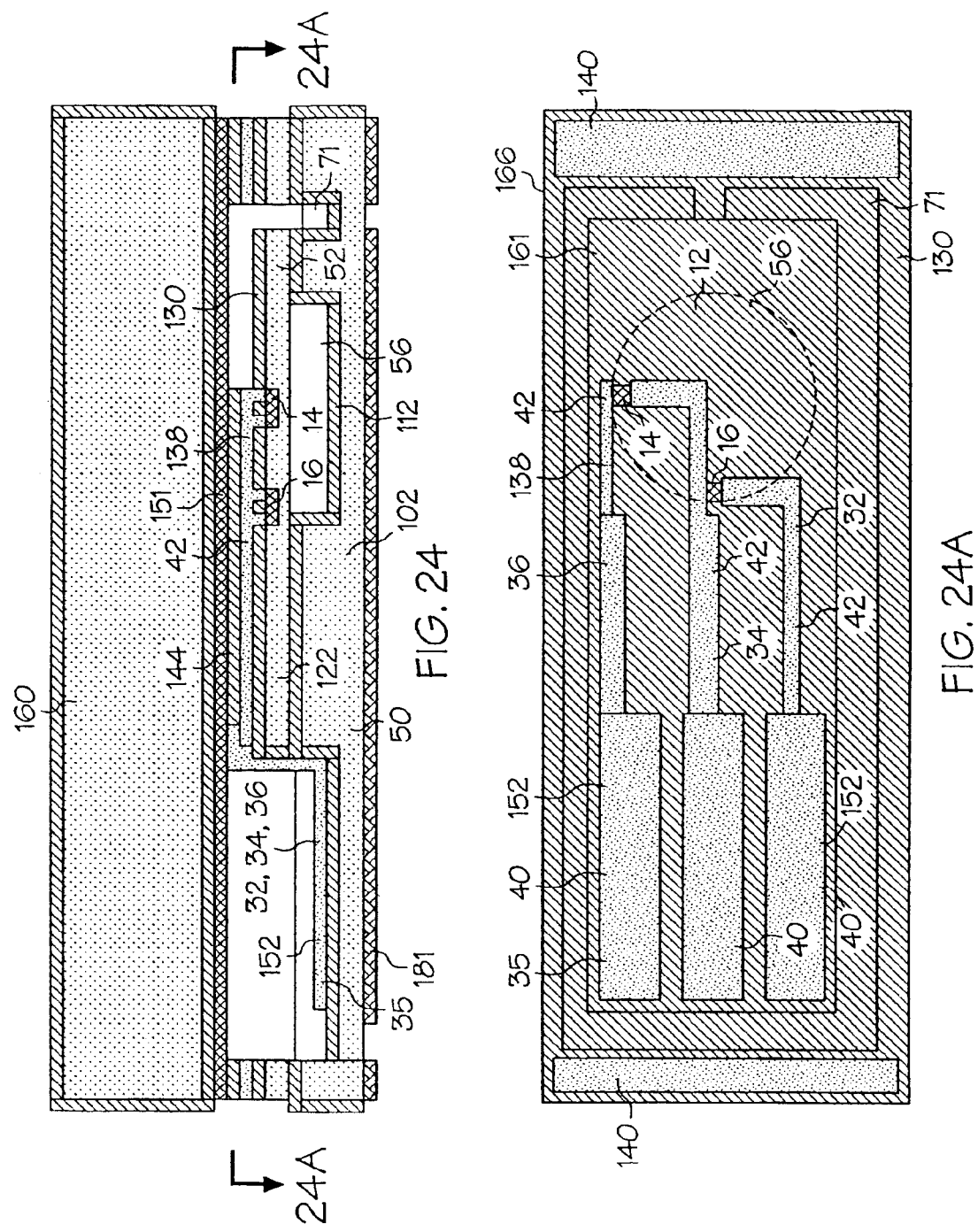

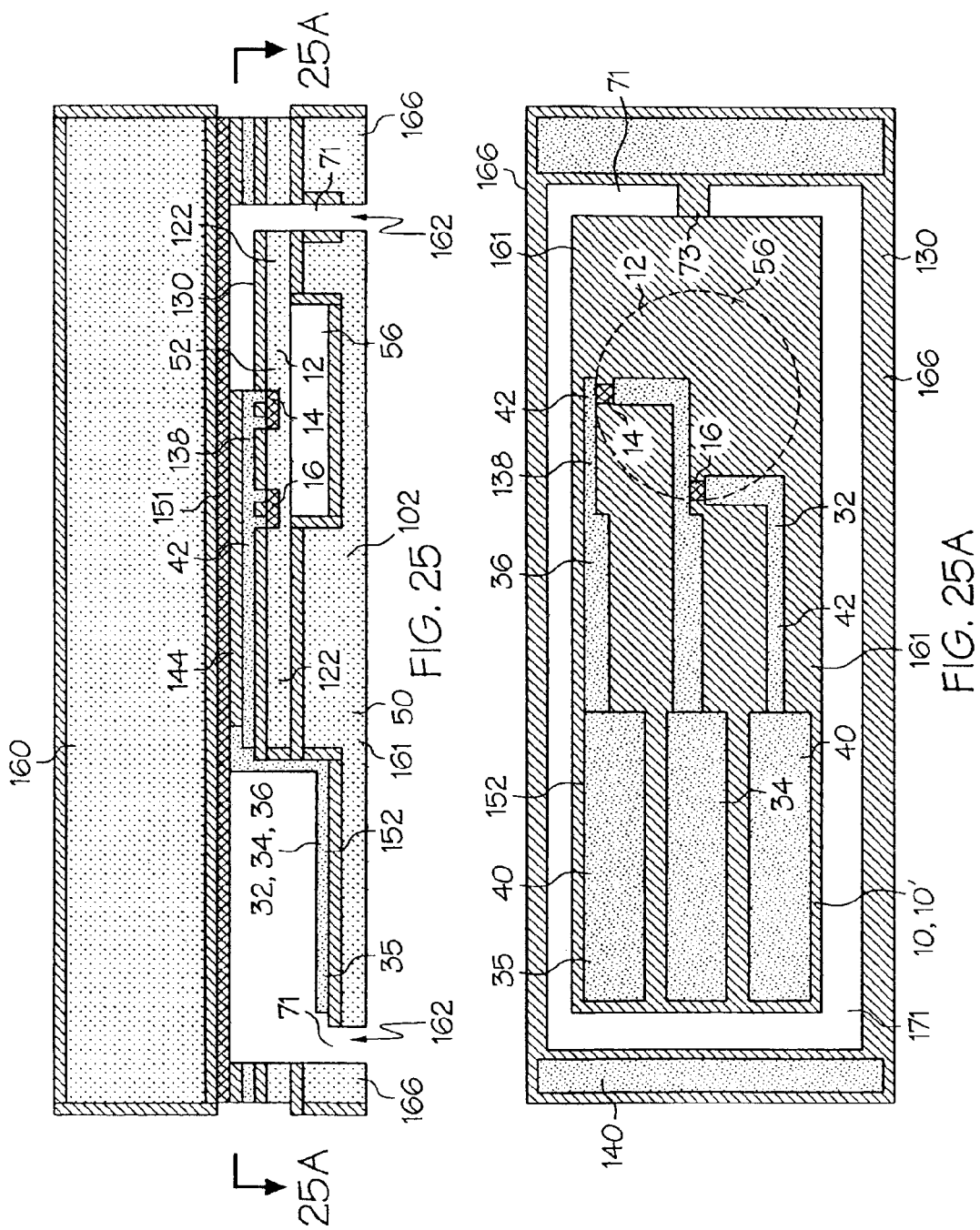

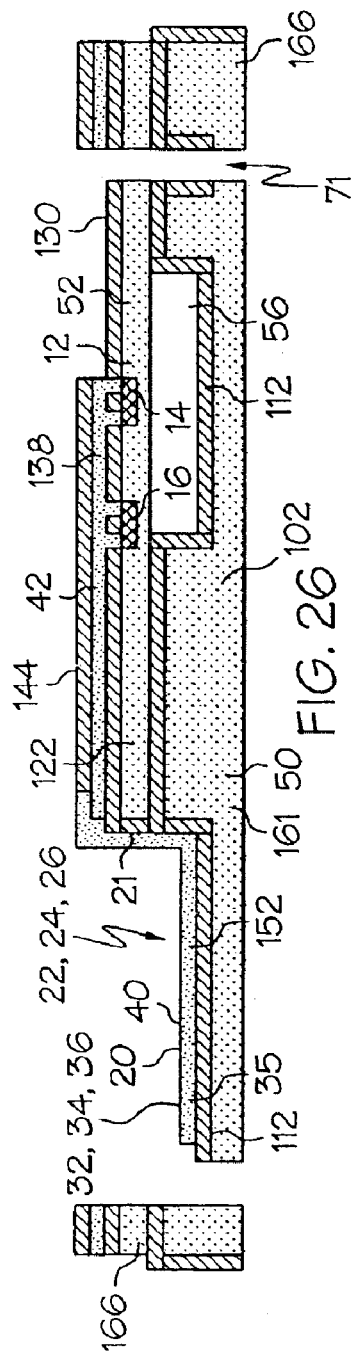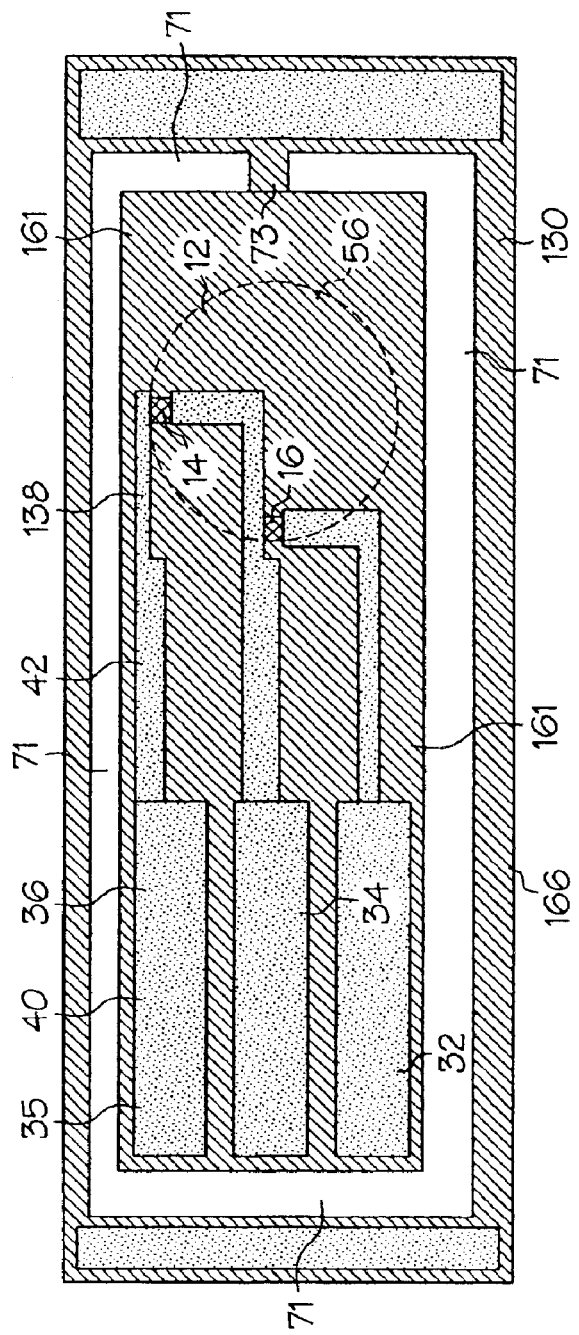

METHOD OF MANUFACTURING A THIN PIEZO RESISTIVE PRESSURE SENSOR

BACKGROUND OF THE INVENTION

The present invention is directed to pressure sensors and method for manufacturing pressure sensors, and more particularly to thin piezo resistive pressure sensors and methods for manufacturing thin piezo resistive pressure sensors.

Piezo resistive sensors are widely used to sense the pressure of various mediums. Small or miniature piezo resistive pressure sensors are often mounted on a guide wire or catheter such that the pressure sensor can be inserted into small volumes to measure the pressure of fluids inside the volume. For example, a guide wire or catheter with a piezo resistive pressure sensor mounted thereon can be inserted into biological flow paths, such as arteries and vessels, and are particularly used in coronary arteries during angioplasty procedures.

There is an increasing need to advance guide wires and catheters into smaller vessels, and a corresponding need for smaller pressure sensors. As the size of pressure sensors are reduced, many existing manufacturing techniques fail to produce pressure sensors having the desired sensitivity and robustness. Accordingly, there is a need for a thin, low profile and robust pressure sensor with a small width.

SUMMARY OF THE INVENTION

The present invention includes pressure sensors that are relatively thin, robust and have a relatively small width, and methods for manufacturing such pressure sensors. The pressure sensors of the present invention may be used in biological and medical procedures. However, the pressure sensors of the present invention are not restricted to such use and can be used in nearly any setting where pressure measurements are desired. In one embodiment, the invention is a method for forming a sensor including the steps of providing a base wafer and forming a sensor cavity in the base wafer. The method further includes the step of coupling a diaphragm wafer to the base wafer, the diaphragm wafer including a diaphragm portion and a sacrificial portion. The diaphragm wafer is coupled to the base wafer such the diaphragm portion generally covers the sensor cavity. The method further includes the steps of reducing the thickness of the diaphragm wafer by removing the sacrificial portion, and forming or locating at least one piezo resistive portion on the diaphragm portion.

In another embodiment the invention is a pressure sensor including a base portion including a silicon bonding surface, the base portion including a sensor cavity. The sensor further includes a diaphragm portion having a silicon bonding surface and directly coupled to the bonding surface of the base portion by a fusion silicon bond. The diaphragm portion has a single crystal silicon diaphragm located over the sensor cavity such that the diaphragm can flex and extend into the sensor cavity with varying pressure. The sensor further includes at least one piezo resistor located on the diaphragm such that the flexure of the diaphragm causes a change in resistance in the at least one piezo resistor.

Various other embodiment of the invention are described herein, and more particularly in the Detailed Description section and accompanying drawings, and the embodiments of the invention briefly described above are illustrative of selected embodiments of the invention, and are not intended to limit the invention to the specified embodiment included above. Other objects and advantages will be apparent from the following description and the accompanying drawings.

BRIEF DESCRIPTION OF THE DRAWINGS

FIGS. 10–26 are a series of side cross-sections and top views illustrating a series of steps that may be used to manufacture the sensors of FIGS. 1–9 and FIG. 27 is a side cross-section illustrating an alternative manufacturing step that may be used in the manufacturing steps of FIGS. 10–26

DETAILED DESCRIPTION

Figure 1:
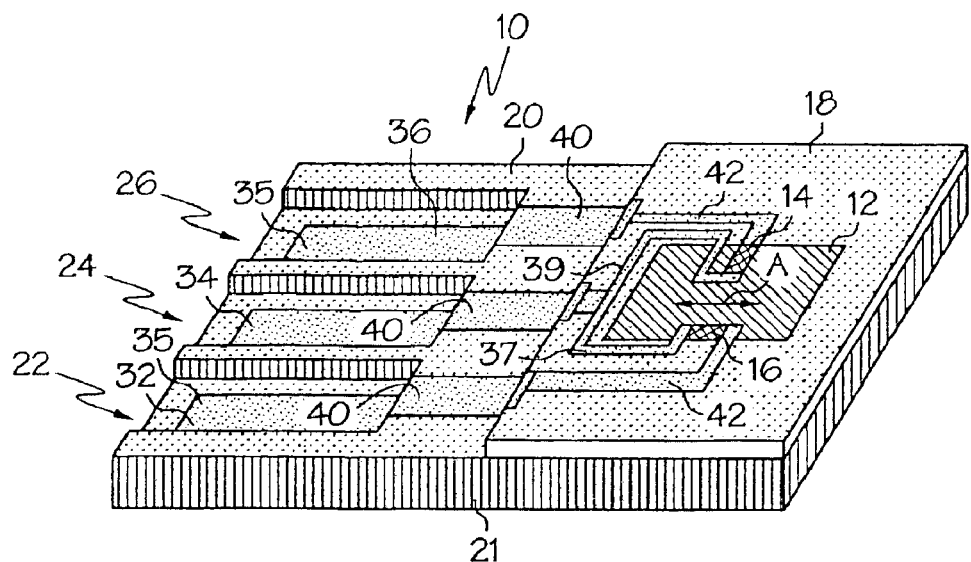
FIG. 1 is a top perspective view of one embodiment of the sensor of the present invention.
Figure 2:
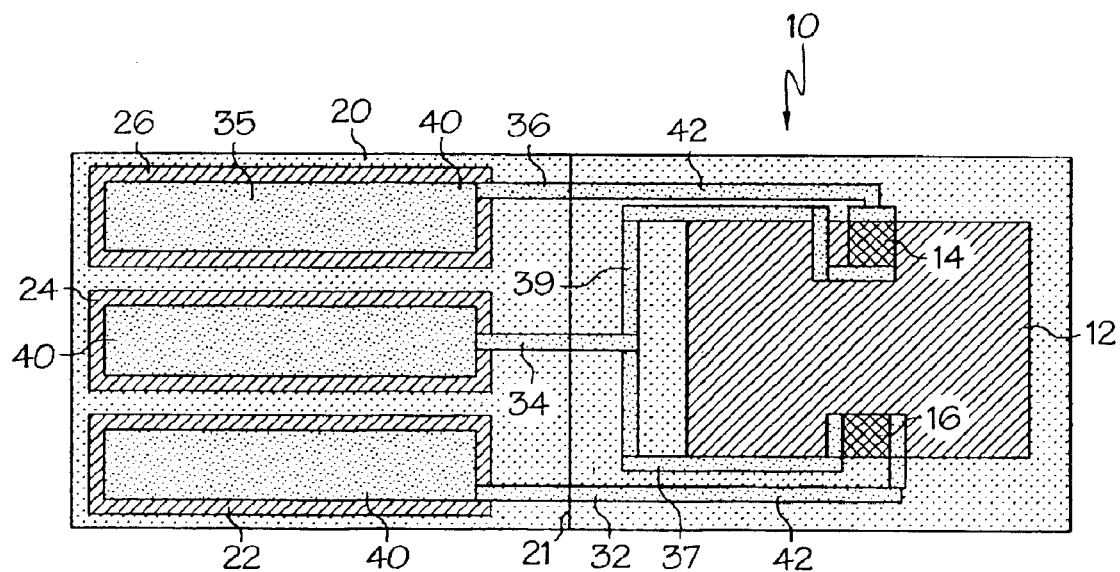
FIG. 2 is a top view of the sensor of FIG. 1.

As shown in FIGS. 1 and 2, in one embodiment the pressure sensor 10 of the present invention includes a relatively thin, deflectable diaphragm 12 and a pair of piezo resistors 14, 16 located on the diaphragm 12. In the embodiment of FIG. 1, the diaphragm 12 is generally square in top view, although the diaphragm 12 may assume various other shapes (including circular, rectangular, etc.) without departing from the scope of the present invention. The diaphragm 12 is preferably, although not necessarily, made of single crystal silicon, and has a crystal plane orientation indicated by the arrow A. In this case, one of the piezo resistors 14, 16 may be located and aligned to sense strain of the diaphragm in a direction parallel to the crystal plane orientation A such that its resistance decreases when the diaphragm 12 is strained, and the other piezo resistor 14, 16 may be located and aligned to sense strain of the diaphragm 12 in a direction perpendicular to the crystal plane orientation A such that its resistance increases when the diaphragm 12 is strained.

The sensor 10 may have an upper portion 18, a lower portion or trough 20, and a lip or step 21 extending between the upper portion 18 and lower portion 20 to form a "tiered" or "step"-shaped sensor 10. The diaphragm 12 and piezo resistors 14, 16 are located on the upper portion 18. In the embodiment of FIGS. 1 and 2, the sensor 10 may include a set of three grooves 22, 24, 26 located on the trough 20 and near a left end of the sensor 10.

Figure 4:
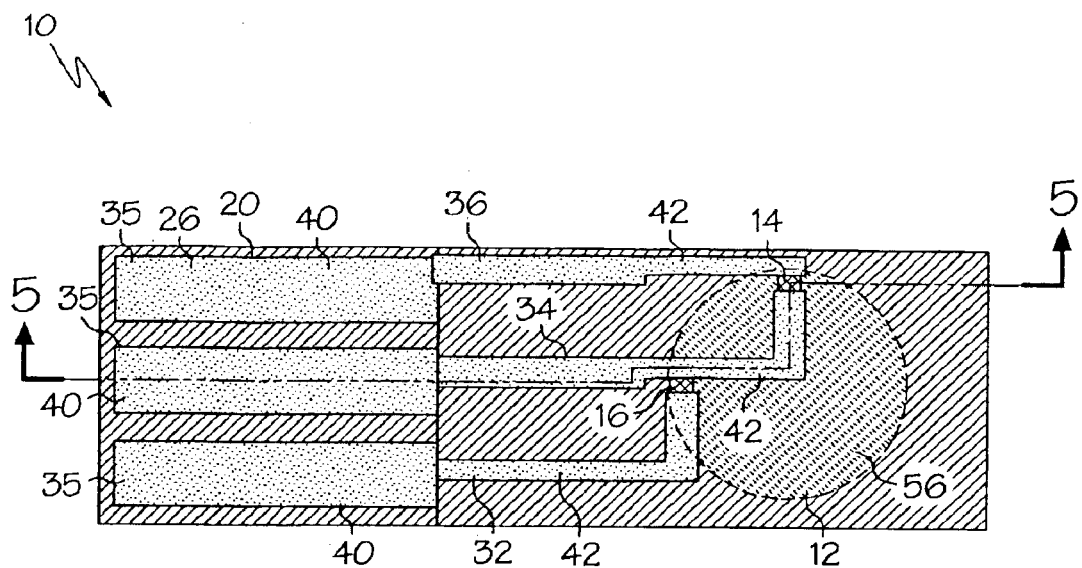
FIG. 4 is a top view of another embodiment of the sensor of the present invention.

The sensor 10 may include a set of three leads 32, 34, 36. Each lead 32, 34, 36 includes a tip, bonding portion, bonding pad or connection end 35 that is located one of the associated grooves 22, 24, 26. Each lead 32, 34, 36 extends from the trough 20 to the diaphragm 12, and is connected to one or both of the piezo resistors 14, 16. However, the sensor 10 need not include the grooves 22, 24, 26, in which case the end of each leads 32, 34, 36 is simply located on top of the trough 20. In the embodiment of FIGS. 1 and 2, lead 36 is coupled to piezo resistor 14 and lead 32 is coupled to piezo resistor 16. Furthermore, lead 34 includes a pair of extensions 37, 39, each extension 37, 39 being coupled to one end of one of the piezo resistors 14, 16. In the embodiment of FIG. 4 the lead 34 is directly coupled to both piezo resistors 14, 16.

Each lead 32, 34, 36 includes a relatively thick portion or connection portion 40 and a relatively thin portion or extension portion 42. The end of each thick portion 40 is located in an associated groove 22, 24, 26 and extends upwardly and over lip 21 and partially along the upper portion 18. The thin portion 42 of each lead 32, 34, 36 extends from the thick portion 40 to one or both ends of the associated piezo resistor 14, 16.

Figure 5:
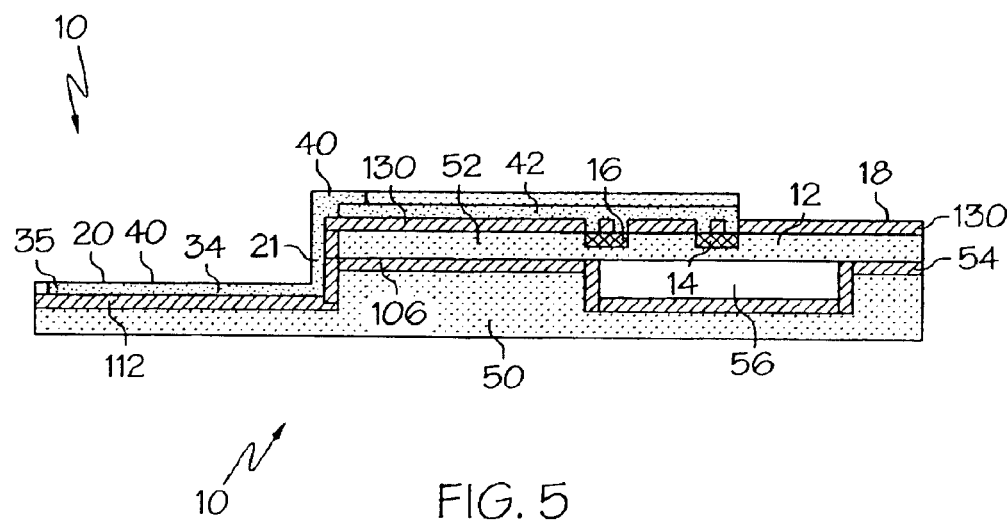
FIG. 5 is a side cross-section of the sensor of FIG. 4.

As shown in FIG. 5, the sensor 10 includes a base wafer 50, a diaphragm wafer 52 located on top of the base wafer 50, and an oxide layer 106 located between the base wafer 50 and diaphragm wafer 52. The base wafer 50 includes the trough 20 and a sensor cavity 56 formed therein. The sensor cavity 56 provides a cavity into which the diaphragm 12 can flex when the diaphragm 12 is exposed to varying pressures. The diaphragm wafer 52 is preferably made of silicon and includes the diaphragm 12 formed or located thereon. The sensor cavity 56 is preferably sealed between the base wafer 50 and diaphragm wafer 52 at a set pressure, such as a vacuum or near-vacuum condition.

The thin portions 42 and part of the thick portions 40 of each of the leads 32, 34, 36 are located on the diaphragm wafer 52. The sensor 10 includes an insulating layer (see layers 112 and 130 of FIG. 5) located between the leads 32, 34, 36 and the bulk materials of the diaphragm wafer 52 and base wafer 50 to electrically isolate the leads 32, 34, 36 from the bulk materials of the diaphragm wafer 52 and base wafer 50. The sensor 10 may include a coating or passivation layer (preferably a biocompatible material, not shown) located on all outer exposed surfaces of the sensor 10.

As shown in FIG. 1, any portions of the leads 32, 34, 36 that are located over the diaphragm 12 are then thin portions 42 of each lead, which helps to minimize any adverse effects the leads 32, 34, 36 may have upon flexure of the diaphragm 12 and overall accuracy of the sensor 10. In other words, if any material must be located on the diaphragm 12, it is preferred to have the material as thin as possible. The thin portions 42 of the leads 32, 34, 36 are relatively thin, which therefore reduces the amount of materials located on the diaphragm 12. In contrast, the thick portions 40 of each lead 32, 34, 36 provides for easier connection of external wires (not shown) to the portions of the leads 32, 34, 36 located in the grooves 22, 24, 26 or on the trough 20, and ensures that the portion of the leads 32, 34, 36 that extends over the lip 21 are sufficiently thick and robust.

In operation, a set of three external wires (not shown) are each coupled to the tip 35 of one of the leads 32, 34, 36, such as by placing each external wire in one of the grooves 22, 24, 26 or otherwise on top of or in contact with an associated lead 32, 34, 36, and soldering or bonding the external wires to the associated lead. The external wires may be coupled to signal conditioning circuitry (not shown), which can in turn, if desired, be coupled to a CPU, controller or processor to control and receive outputs from the piezo resistors 14, 16. For example, the signal conditioning circuitry/controller may be used to sense and measure the resistivity of the piezo resistors 14, 16, sense and measure other conditions (such as temperature and ambient pressure), calculate pressure sensed by the sensor 10, etc.

After the sensor 10 is coupled to the signal conditioning circuitry, the sensor 10 is then immersed in the fluid to be sensed. The diaphragm 12 is deflected into the sensor cavity 56 due to the pressure differential between the fluid and the sensor cavity 56, and the change in resistance of the piezo resistors 14, 16 due to the deflection of the diaphragm 12 can be sensed by the signal conditioning circuitry/controller.

The set up and the connections between the leads 32, 34, 36 and piezo resistors 14, 16 provide a circuitry setup that enables the resistivity of the piezo resistors 14, 16 to be sensed and measured with only three output leads. For example, the piezo resistors 14, 16 are preferably connected to two reference resistors (not shown) in a wheatstone bridge configuration. The reference resistors may be located on the sensor 10, 10', but are preferably located remote from the sensor 10, 10'. The wheatstone bridge enables the resistivity of the piezo resistors 14, 16 to be accurately measured in a well known manner. With the resistivity of the piezo resistors 14, 16 known, the flexure of the diaphragm 12 and/or pressure of the adjacent fluid can be determined by look-up tables or formulas in a well-known manner. The resistivity of the piezo resistors 14, 16 can also be measured by directly measuring the resistivity of the piezo resistors. For example, in the embodiments of FIGS. 1–4, 8 and 9, a voltage can be applied to leads 32 and 34 to measure the resistivity of piezo resistor 16. Similarly, a voltage can be applied to leads 34 and 36 to measure the resistivity of piezo resistor 14.

Figure 7:
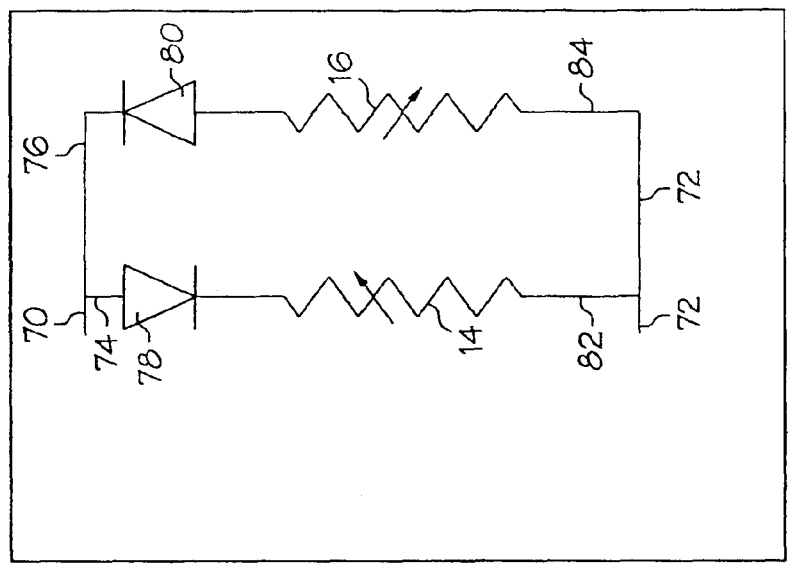
FIG. 7 is a circuit diagram of the sensor of FIG. 6.
Figure 6:
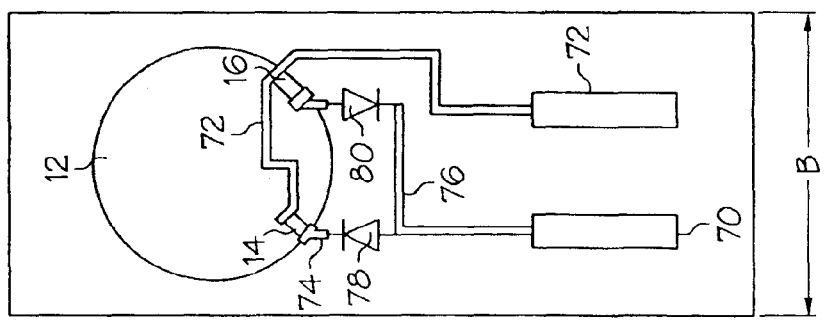
FIG. 6 is a top schematic representation of an alternate embodiment of the sensor of the present invention.

FIGS. 6 and 7 illustrate an alternate embodiment of the invention, wherein the resistivity of the piezo resistors 14, 16 can be individually sensed and measured using only two output leads. In this embodiment, the sensor 10' includes two output leads 70, 72. Output lead 70 includes a first leg 74 that is coupled to a first side of piezo resistor 14, and a second leg 76 that is coupled to a first side of the piezo resistor 16. The first leg 74 includes a diode 78 in the illustrated orientation and polarity, and the second leg 76 includes a diode 80 in the illustrated orientation and polarity. The lead 72 is coupled to a second side of the piezo resistor 16 and a second side of the piezo resistor 14 in series.

In order to sense the resistivity of piezo resistor 14, a voltage is applied to first 70 and second 72 leads such that the current travels from lead 70, through the first leg 74 of lead 70 and its associated diode 78, through the piezo resistor 14 and back through the second lead 72. The current is blocked from flowing through the second leg 76 of the lead 70 by diode 80. With current flowing only through the piezo resistor 14, its resistivity can then be measured.

Similarly, when it is desired to measure the resistivity of piezo resistor 16, a voltage is applied to leads 70, 72 such that the current runs through lead 72, through piezo resistor 16, through the second leg of lead 76 and its associated diode 80 and finally back to the connection portion of lead 70. The current is blocked from flowing through the first leg 74 of lead 70 by the diode 78. As shown in FIG. 7, the arrangement of leads 70, 72 of FIG. 6 results in two circuit lines 82, 84 connected in parallel, each circuit line 82, 84 including one of the piezo resistors 14, 16 and oppositely oriented diodes 78, 80.

In the embodiment of FIGS. 6 and 7, a current is passed through only one of the piezo resistors 14, 16 at a time. Accordingly, each piezo resistor 14, 16 may be coupled to a wheatstone bridge circuit (not shown) that includes three other resistors and signal conditioning circuitry to measure the resistivity of the piezo resistors 14, 16.

In this manner, the circuitry of FIGS. 6 and 7 has opposite polarity signals for measuring two different resistor values. Because only two lead lines 70, 72 are used, the width B of the sensor can be reduced, the time required to make connections to the sensor is reduced, and the robustness of the sensor is increased (by reducing the number of connections).

Figure 8:
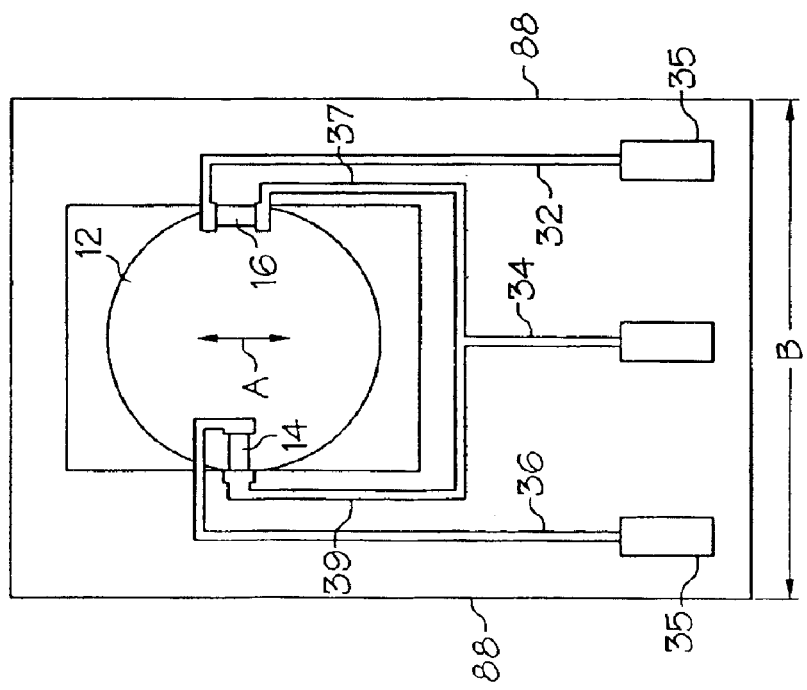
FIG. 8 is a top view of one embodiment of the sensor of the present invention.

As shown in FIG. 8, the diaphragm 12 may be oriented such that the crystal plane orientation A of the diaphragm is parallel to (i.e., forms no angle with) the body of the sensor 10. In other words, the crystal plane orientation A is parallel to the leads 32, 34, 36 and the length and outer edges 88 of the sensor 10. However, in an alternate embodiment shown in FIG. 9, the diaphragm 12 is oriented such that the crystal plane orientation A forms an angle of about 45° with the leads 32, 34, 36, or with the body, or with the outer long edges 88 of the sensor 10. When the diaphragm 12 is oriented in this manner, the piezo resistors 14, 16 can be located in their configuration shown in FIG. 10, wherein the piezo resistors 14, 16 are aligned with the crystal plane orientation A and both form an angle of about 45° with the leads 32, 34, 36 or the long edges 88 of the sensor 10.

Figure 9:
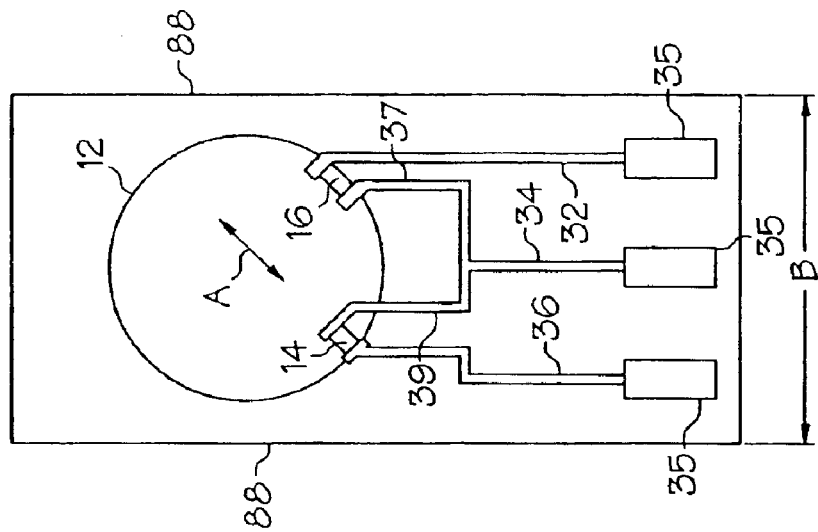
FIG. 9 is a top view of an alternate embodiment of the sensor of the present invention.

Furthermore, when the diaphragm 12 is oriented as shown in FIG. 9, the piezo resistors 14, 16 can thereby be located near the outer edges of the diaphragm 12. Because both ends of both piezo resistors 14, 16 are located at or adjacent to the outer edge of the diaphragm 12, the length of the leads 32, 34, 36 located on the diaphragm 12 is reduced. Furthermore, because the piezo resistors 14, 16 are both located near the longitudinal center of the sensor 10, the leads 32, 34, 36 can also be correspondingly located near the longitudinal center of the sensor 10. In other words, in the arrangement of FIG. 9, the leads 32, 34, 36 need not extend around the outer edges of the diaphragm 12 (as compared to the arrangement of FIG. 8). Thus, the lateral distance between leads 32, 34, 36 can be reduced, and the corresponding width B of the sensor 10 can be reduced. Thus, the 45° rotation of the diaphragm 12 helps to reduce the overall size (width) of the sensor.

Figure 3:
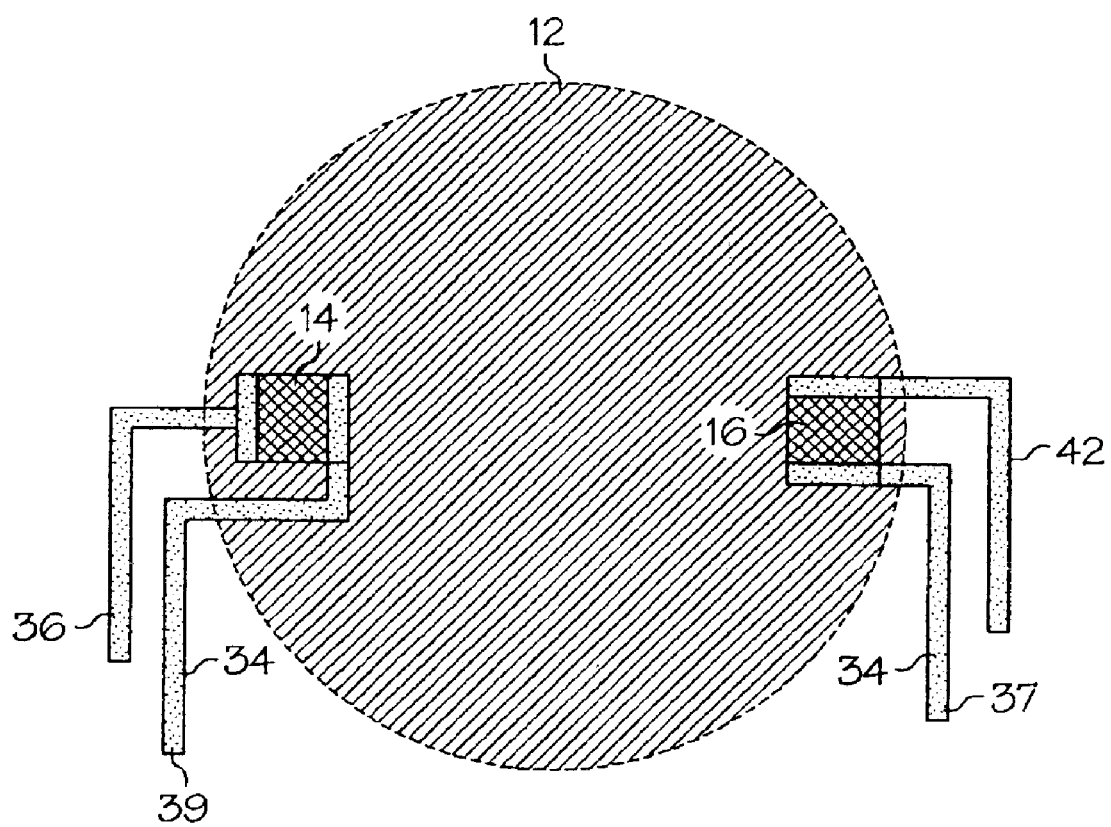
FIG. 3 is a top view of an alternate embodiment of the diaphragm and piezo resistors of the sensor of FIG. 1.

As shown in FIG. 3, the piezo resistors 14, 16 located on the diaphragm 12 may be square. In most prior art piezo resistors, the resistors have a high length-to-width ratio in order to reduce the transverse sensitivity of the piezo resistors. More particularly, because a piezo resistor is typically desired to sense a strain in a single direction only, a long piezo resistor is often provided and aligned with the direction in which it is desired to sense strain so that strains along the length of the piezo resistor affect the resistance value of the piezo resistor in a much greater manner than strains in other directions. Piezo resistors may also be shaped in a "serpentine" pattern to increase the overall length-to-width ratio of the piezo resistor.

The resistance of a square piezo resistor can be determined by the following equation:

$$R \approx \rho * L/(t*W)$$

where $\rho$ is the resistivity, L is the length, W is the width and t is the thickness of the piezo resistor. When the diaphragm is strained, the length of the piezo resistor changes (increases) according to the equation:

$$L \approx L_0 * (1+k\epsilon)$$

where $L_0$ is the initial length of the piezo resistor, k is a constant and $\epsilon$ is the strain of the diaphragm. Although most metals in most macro applications are not normally very elastic, when the metal (or other conductive materials) of the leads are made sufficiently thin, such as in the present invention, they are fairly elastic. For example, the piezo resistors 14, 16 of the present invention may be only 1 micron or less thick (i.e. preferably about 0.5 microns thick), and are therefore elastic. The thickness of the piezo resistor may vary with differing conditions, such as the thickness and size of the diaphragm. Thus, because the piezo resistors 14, 16 are square and elastic, the width of the piezo resistor is also significantly changed when the diaphragm is strained.

When the piezo resistor is strained, the width of the piezo resistor changes (decreases) according to the equation:

$$W \approx W_0 * (1-k\epsilon)$$

where $W_0$ is the initial length of the piezo resistor. Thus, when an elastic piezo resistor is strained, its resistance becomes:

$$R_{strained} \approx \frac{\rho * (L_0 * (1+k\epsilon))}{t * (W_0 * (1-k\epsilon))}$$

In this manner, the resistance of the strained piezo resistor is increased by both the upper part of the equation (numerator) and the lower part of the equation (denominator), and therefore the overall change in resistance is increased. This, of course, "magnifies" the change in resistance and results in a more sensitive piezo resistor.

Of course, the piezo resistors 14, 16 may be other shapes besides square and still provide the increased sensitivity benefits described above. More broadly, the piezo resistors are preferably generally symmetrical about two axis, such as square or nearly square or various other shapes, although the piezo resistors preferably have a shape with at least two straight edges for ease of bonding the leads to the piezo resistors. The piezo resistors can vary from being strictly symmetrical about two axis, without departing from the scope of the present invention, so long as the piezo resistors have sufficiently elasticity (by "elastic" or "elasticity" it is meant that a strain in one direction changes the dimensions of the piezo resistor (i.e. by the Poisson's ratio of the material) in an direction perpendicular to the applied strain in an appreciable manner (i.e. a manner that changes the resistivity of the piezo resistor in a manner that can be sensed and confirmed by instrumentation)). For example the piezo resistor may be a rectangle having a length-to width ratio of up to 10-to-1 or less, preferably 3-to-1 or less, further preferably 1-to-1. However, the piezo resistors can have a length-to-width ratio even higher than 10-to-1 if the material of the piezo resistors is sufficiently elastic (i.e. by being sufficiently thin).

Furthermore, as noted earlier, both piezo resistors 14, 16 are preferably connected to a wheatstone bridge to measure the resistance of the piezo resistors. As is well know, the sensitivity of a piezo resistor in a wheatstone bridge is proportional to R1/(R1+R2) (where R1 and R2 are the resistivities of the piezo resistors, respectively). Thus, the use of a wheatstone bridge further "magnifies" the change in resistance of the piezo resistors and helps to further increase the sensitivity of the piezo resistors.

In the present invention, the square resistors have equal sensitivity in both directions. The square resistors are preferably arranged in opposite orientations such that a strain that causes a drop in resistance of one piezo resistor causes an increase in resistance in the other piezo resistor. In theory, the change of resistance of each piezo resistor will be equal and opposite.

Furthermore, piezo resistors having the desired elasticity, and/or that are generally symmetrical about two axes, can be used in nearly any setting where piezo resistors are used, and are not restricted to use with pressure sensors. For example the piezo resistors may be used in a variety of flow sensors, accelerometers, strain gages, positional sensors, pressure sensors, etc. More particularly, the piezo resistor may be used with nearly any sensor having a movable component. For example, when the sensor is a flow senor or a pressure sensor, the movable component may be a diaphragm. When the sensor is an accelerometer, the movable component may be a proof mass or an arm or diaphragm coupled to the proof mass. When the sensor is a position sensor, the movable component may be an arm that can be rotated. When the sensor is a strain gage, the movable component may be the body of the sensor that is strained.

Thus, the piezo resistor of the present invention can be located on the movable component of nearly any sensor. In this case, the piezo resistor is preferably mounted on or adjacent to the movable component such that the resistivity of said piezo resistor varies with the movement of said movable component. In this manner the movement and/or degree of movement of the movable component can be determined by measuring the variable resistivity of the piezo resistor. For example, when used in pressure sensors the piezo resistor will have different resistance values depending upon the flexure of the diaphragm.

FIGS. 10–27 illustrate one method for forming the sensors 10, 10' of FIGS. 1–9, although various other methods of forming the sensor may be used without departing from the scope of the invention. The sensors 10, 10' may be batch processed such that a plurality of sensors 10, 10' are formed on a single, larger wafer or wafers simultaneously. However, for ease of illustration, FIGS. 10–27 illustrate only a single sensor 10, 10' being formed. The majority of FIGS. 10–27 are longitudinal cross sections that generally correspond to FIG. 5. However, various figures are also top views of the sensor 10, 10' or of masks used in the manufacturing process. Furthermore, the manufacturing steps illustrated herein are only one manner in which the sensor 10, 10' of the present invention may be manufactured, and the order and details of each step described herein may vary, or other steps may be used or substituted with other steps well known in the art.

As shown in FIG. 10, the process begins with a base wafer or base portion 50, which is preferably a silicon-on-insulator N type wafer. In one embodiment, the base wafer 50 includes a lower or sacrificial silicon layer 100 having a thickness of about 400 microns and an upper silicon layer 102 having a thickness of about 70 microns (the relative thicknesses are not shown to scale in the accompanying drawings). A thin insulating layer 104 is located between the upper 102 and lower 100 silicon layers. The base wafer 50 may also include upper 106 and lower 108 insulating layers formed thereon. The insulating layers 104, 106, 108 may each be a layer of silicon dioxide having a thickness of about 1 micron. The upper 102 and lower 100 silicon layers are preferably either undoped or very low doped silicon, such that they have a high electrical resistance. However, the base wafer 50 may also be made from a variety of materials besides silicon, such as amorphous silicon, polysilicon, silicon carbide, germanium, polyimid, ceramics, nitride, sapphire, silicon nitride, glasses, a combination of these materials or nearly any other machinable material.

The upper oxide layer 106 and upper silicon layer 102 are then etched to form the desired shape of the sensor cavity 56, trough 20 and, if desired, grooves 22, 24, 26 (see FIG. 11). The grooves 22, 24, 26 may be etched, or partially etched, at this stage. Alternately, if desired the grooves 22, 24, 26 may be formed later in the manufacturing process as described below. It may be desired to postpone etching the grooves 22, 24, 26 until a later time to improve subsequent photolithography processes.

The sensor cavity 56 is etched to a depth sufficient to accommodate the anticipated flexure of the diaphragm 12, for example, about 1–2 microns. The upper oxide layer 106 and upper silicon layer 102 are also etched at 79 to define the upper edge of a dicing lane 71 that extends about the perimeter of the sensor 10 and defines an arm 73. As shown in FIG. 26A, the dicing lane 71 preferably does not extend completely around the sensor, as the dicing lane 71 is etched to define a frame 166, a body portion 161 located inside the frame 166, and an arm 73 extending between the body portion 161 and the frame 166. Various etching methods may be used to etch the upper oxide layer 106, such as a photoresist and a wet etch (i.e., a buffered solution of hydrochloric acid). Various etching methods may be used to etch the upper silicon layer 102, preferably deep reactive ion etching ("DRIE"). The sensor cavity 56 is formed in the desired shape, such as circular in top view. The lower oxide layer 108 may also be removed, if desired.

Next, as shown in FIG. 11, an insulating layer 112, such as a thermal oxide having a thickness of about 1–2 microns, is formed, deposited or grown over the top exposed surfaces of the base wafer 50. Next, as shown in FIG. 12, a diaphragm wafer or diaphragm portion 52 is provided. The diaphragm wafer is preferably a silicon-on-insulator wafer having an upper or sacrificial silicon layer 120 having a thickness of about 300 microns, a lower silicon layer 122 having a thickness of about 2 microns, and a thin insulating or oxide layer 124 located between the silicon layers 120, 122.

The lower silicon layer 122 of the diaphragm wafer 52 is preferably undoped or very low doped such that it has a high electrical resistance. The diaphragm wafer 52 can be made from a variety of materials besides silicon, such as the materials listed above for the base wafer 50. Because the lower layer 122 of the diaphragm wafer will ultimately form the diaphragm or diaphragm portion 12, the materials and thickness of the lower layer 122 should be carefully selected. The base wafer 50 and diaphragm wafer 52 are then bonded together as shown in FIG. 12, preferably by fusion silicon bonding ("FSB"). The areas of common contact between the base wafer 50 and diaphragm wafer 52 (the bonding areas) are bonded together. FSB includes the application of heat and pressure which forms a fusion silicon bonding zone or region 51, which includes portions of silicon contributed by both of the wafers 50, 52. FSB is preferred because it provides a strong bond, even when the wafers 50, 52 have relatively little common surface areas for bonding. Although the base wafer 50 may include an oxide layer 106 thereon, the base wafer 50 can be fusion silicon bonded to the diaphragm wafer 52 because the oxide layer 106 is quite thin, and an oxide layer may even be aid in the FSB processes.

Although the wafers 50, 52 are preferably silicon wafer, even if the wafers 50, 52 are not silicon, each of the wafers 50, 52 may each include a bonding portion that is made of silicon. The bonding portions of the wafers 50, 52 can then be placed into contact and fusion silicon bonded together. The FSB may take place in a chamber at vacuum or near-vacuum conditions such that the cavity 56 is sealed at a vacuum or near-vacuum conditions.

Next, as shown in FIG. 13, the upper silicon layer 120 of the diaphragm wafer 52 is removed, such as by DRIE, wet etching, or various other etching methods. The insulating layer 124 of the diaphragm wafer 52 is also removed, such as by dry etching or various other etching methods, leaving behind the lower layer 122.

Next, as shown in FIG. 14, a mask or layer of patterned photoresist 128 is located on top of the lower silicon layer 122 of the diaphragm wafer 52, and the exposed portions of the diaphragm wafer 52 are implanted with high energy ions or atoms to decrease the resistivity of the exposed portions of the diaphragm wafer 52. This implantation step is used to form or implant the piezo resistors 14, 16 at the desired locations on the diaphragm (see FIG. 14A). However, the piezo resistors 14, 16 can be formed or located on the diaphragm by a wide variety of methods, including providing pre-formed piezo resistors and locating and coupling the pre-formed piezo resistors on the diaphragm wafer 52. The piezo resistor 14, 16 can also be formed by depositing a layer of piezo resistive material, such as a conductive material, on the diaphragm 12 and etching the conductive material to form the piezo resistors. As noted above, it may be desired to have relatively thin piezo resistors (i.e. about 0.5 microns thick) such that the piezo resistors are elastic to improve the sensitivity of the sensor 10.

Next, as shown in FIG. 15, the photoresist layer 128 is removed, and the upper surface of the diaphragm wafer 52 is coated with a passivation layer 130 to form an electrically isolating layer. The passivation layer 130 preferably includes a layer of oxide and/or a layer of nitride, although a variety of other passivation materials may be used. Next, as shown in FIG. 16, a set of "windows" or vias 132 are opened in the passivation layer 130 to provide access to the piezo resistors 14, 16. The passivation layer 130 may be etched by various methods, such as by various dry etching processes.

Figure 17:
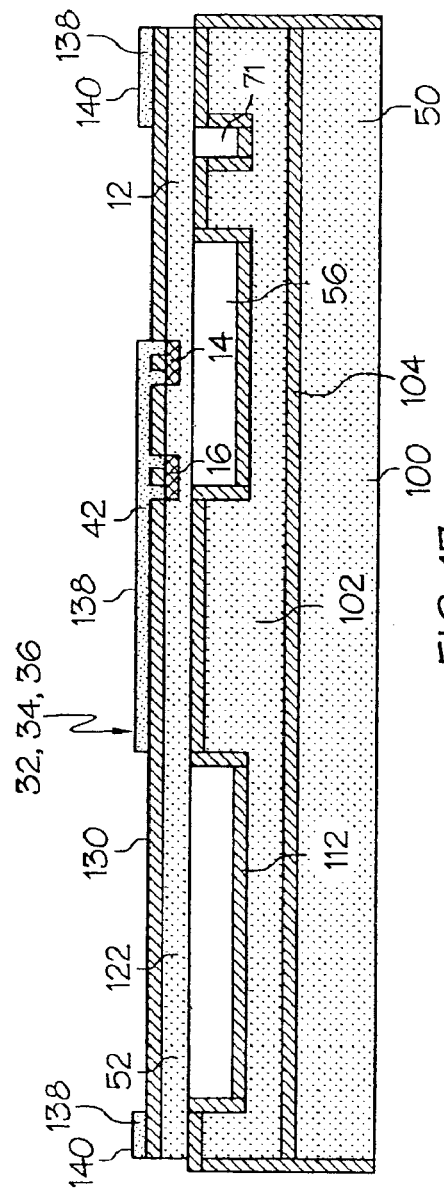
Figure 17A:
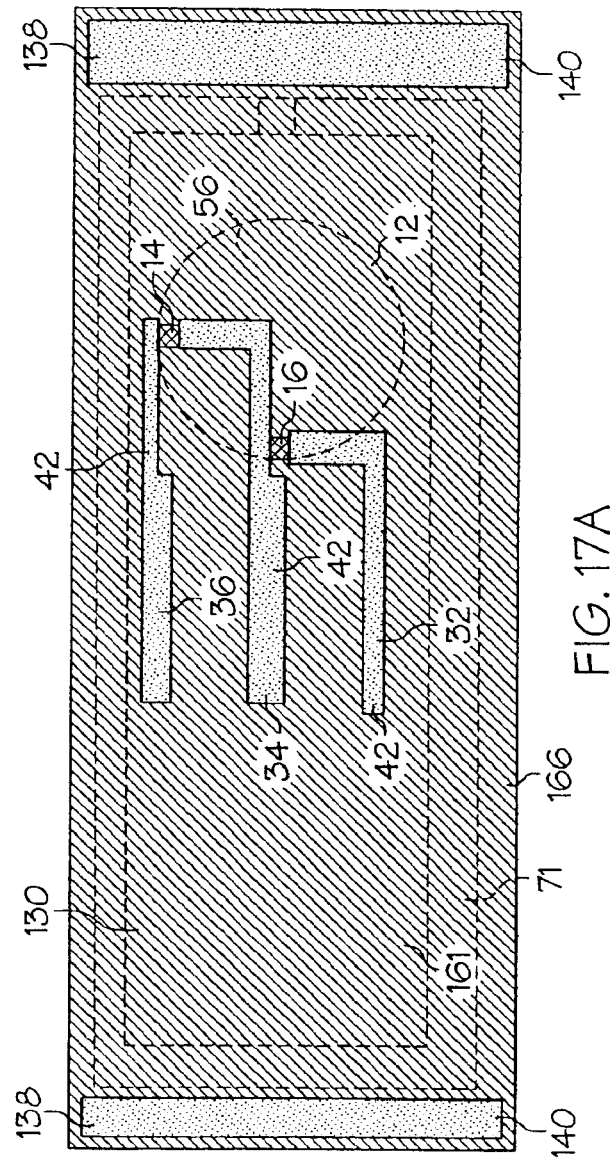

As shown in FIG. 17, a conductive material 138 is then deposited on top of the passivation layer 130 of the diaphragm wafer 52. The conductive material 138 can be nearly any conductive, machinable material such as silicon or metal (preferably titanium, but may also include aluminum, copper or other materials), and is preferably relatively thin, such as less than 1 micron thick, preferably 0.1–0.2 microns thick. The deposited conductive material 138 extends through the vias 132 to make electrical contact with the piezo resistors 14, 16. The conductive material 138 is then patterned, such as by etching, to form the desired shape of the thin portions 42 of the leads 32, 34, 36. A portion of the conductive material 138 may also be patterned to form a spacer 140 that extends along the edges of the device (see FIG. 17A) or around the perimeter of the device. Alternately, instead of depositing and etching the conductive material 138, the conductive material 138 may be deposited in the desired shape by placing a mask on the diaphragm wafer 52 before deposition of the conductive material 138.

Figure 18:
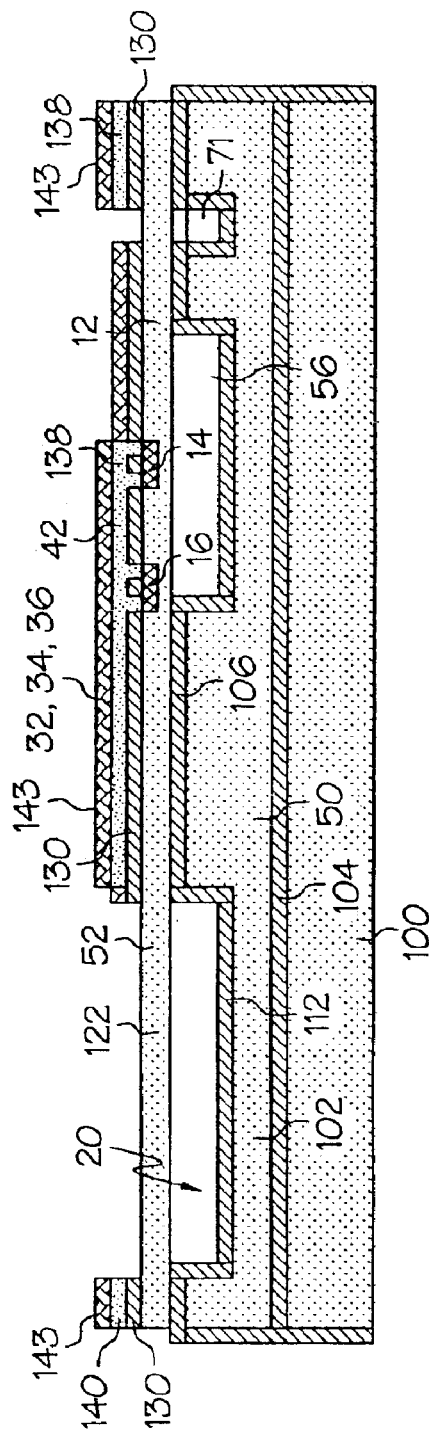

Next, as shown in FIG. 18, the portions of the passivation layer 130 located on top of the trough 20 and dicing lanes 71 are removed, and a photoresist layer 143 is then located on top of the conductive material 138. Any photoresist 143 located on top of the trough 20 and dicing lanes 71 is then removed.

Figure 19:
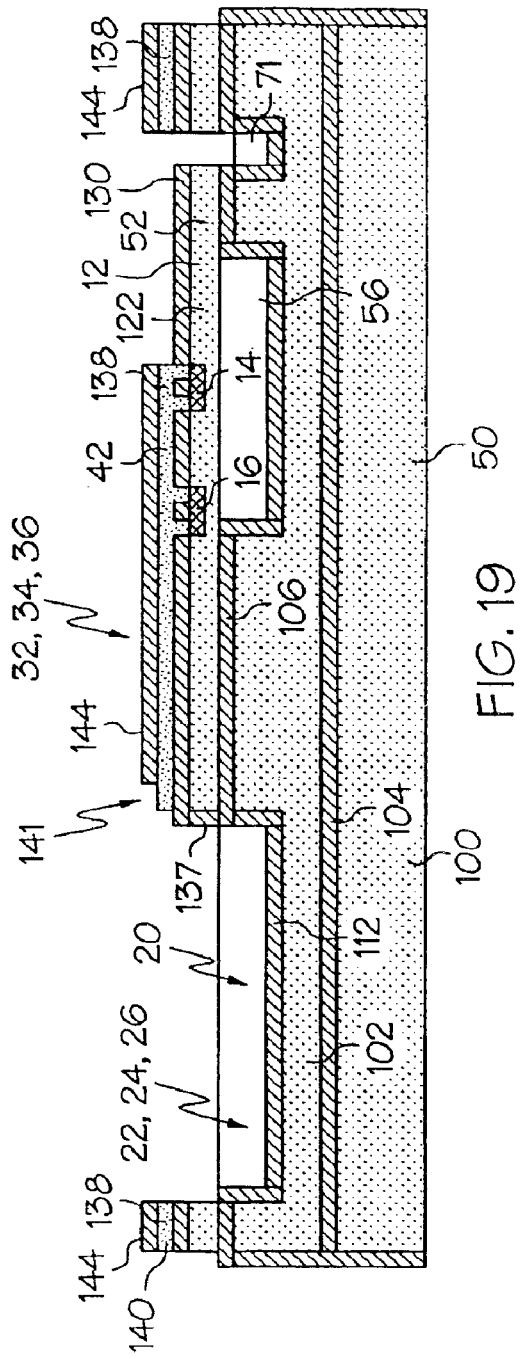

As shown in FIG. 19, the portions of the lower silicon layer 122 located above the trough 20 and dicing lane 71 are then removed by various removal techniques, such as etching, preferably DRIE. The photoresist layer 143 is then removed. If not formed earlier, the grooves 22, 24, 26 may be formed in the trough 20 at this time by a variety of etching methods, such as DRIE, dry etching, etc. An oxide layer 137 is then deposited or formed on the newly-exposed portion of the silicon layer 122 located adjacent to the leads 32, 34, 36 and the newly-exposed portions of the silicon layer 122 that form the grooves 22, 24, 26. An upper passivation layer 144 is then deposited and then etched, or deposited through a mask. The upper passivation layer 144 preferably includes a layer of oxide and/or a layer of nitride, although a variety of other passivation materials may be used. A portion of the upper passivation layer 144 located at an end of the thin portion 41 of each lead 32, 34, 36 is removed to create an exposed portion 141 for each lead.

Next, a shadow mask 150 having three longitudinal slots 151 is provided (FIG. 20 is a top view of the mask 150). Each of the slots 151 corresponds to the desired location of the thick portion 40 of the leads 32, 34, 36. The mask 150 is then located on top of the diaphragm wafer 52, and a layer of conductive material 152, such as titanium, is then sputtered through the slots 151 of the mask 150 and onto the diaphragm wafer 52 and base wafer 50 to form the thick portions 40 of the leads 32, 34, 36(see FIG. 21). The deposited material 152 contacts the thin portion 41 of each lead at the exposed portions 141 to ensure that the thick portions 40 of the leads 32, 34, 36 contact the corresponding thin portion. Alternately, the conductive material 152 may be deposited on the diaphragm wafer 52 and base wafer 50, and then patterned in the desired shape. The conductive material 152 can be any of a wide variety of materials, such as the materials listed above for the conductive layer 138. The material sputtered during this step is preferably relatively thick, such as between about 5–20 microns thick. An advantage of having a relatively thin diaphragm wafer 52 is that the lip 21 is also relatively small. Thus, the lip 21 can be more easily covered by the conductive material 152 that is deposited during this step.

Next, if desired, bonding or soldering metals such as nickel, gold and the like (not shown) is then sputtered onto the tips 35 of the leads 32, 34, 36 to provide a convenient surface and materials for bonding external wires to the leads 32, 34, 36. If desired, another passivation layer (i.e., a bio-compatible passivation layer, or a passivation layer to protect the electronics of the sensor) may be located on the upper surfaces of the system.

Next, as shown in FIG. 22, a carrier wafer 160 is provided. The carrier wafer 160 can be nearly any material that has sufficient mechanical stiffness to lend stiffness and stability to the diaphragm wafer 52 and base wafer 50, such as silicon with a thickness of about 500 microns. The carrier wafer 160 is then coupled to the diaphragm wafer 52 by any of a variety of methods, such as crystal bonding or frit bonding 151. The spacer 140 helps to provide a flat surface to the diaphragm wafer, such that the carrier wafer 160 may be coupled to the upper passivation layer 144 located on the spacer 140. In this embodiment, the carrier wafer 160 is bonded to the body portion 161 of the sensor, including, for example, the upper passivation layer 144 located on top of the portion of the leads 32, 34, 36 located on the diaphragm wafer 52.

Figure 23:
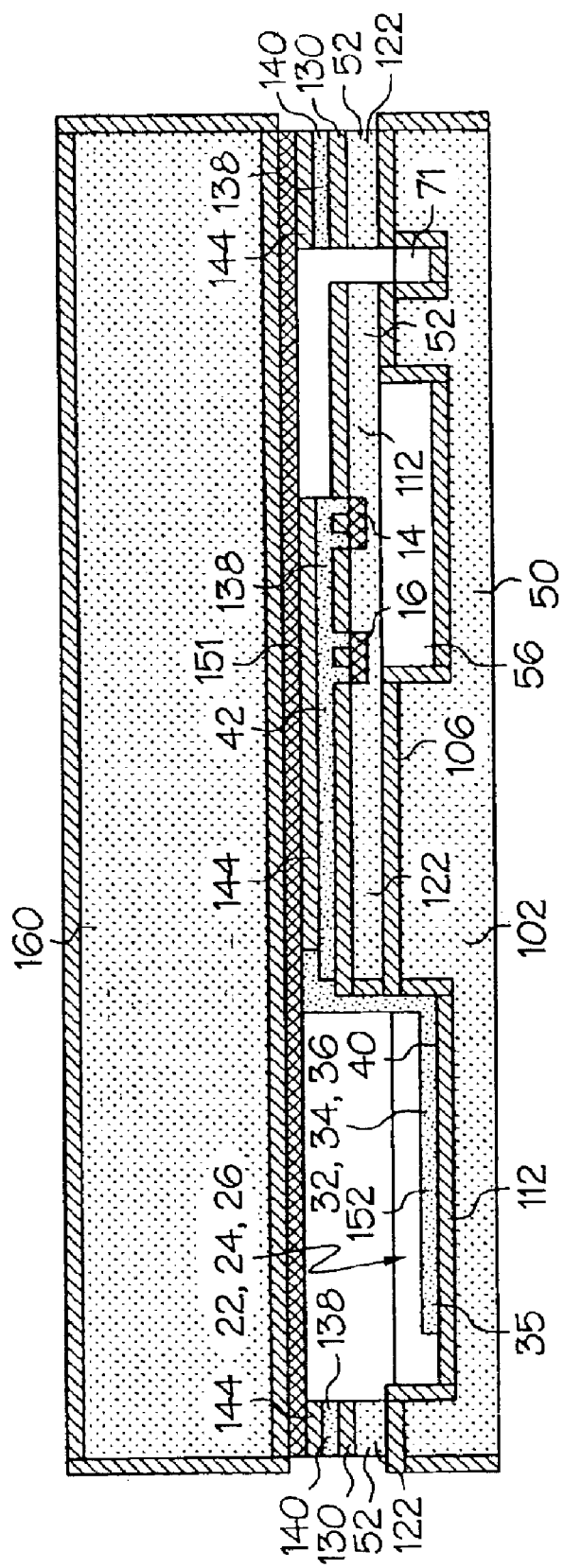

As shown in FIG. 23, the lower silicon layer 100 and insulating layer 104 of the base wafer 50 are then removed, such as by a wet or dry etch. At this stage, the base wafer 50 is only about as thick as the upper silicon layer 102 (i.e., about 70 microns thick), and the diaphragm wafer 52 is only about as thick as the lower silicon layer 122 (i.e., about a few microns thick) and therefore the carrier wafer 160 provides stiffness to the wafers 50, 52, and enables the wafers 50, 52 to be handled and diced without breakage of the wafers 50, 52. Thus, it may be desired to ship the sensor or wafer of sensors to a customer while the carrier wafer 160 is still bonded to the diaphragm wafer.

Next, as shown in FIGS. 24 and 24A, a photoresist 181 is located on the lower surface of the base wafer 50, and the photoresist 181 is patterned to match the dicing lines 71. As shown in FIG. 25, the lower portion 162 of the dicing lanes 71 are then etched, such as by DRIE on the back side of the lower silicon layer 100 of the base wafer 50. The lower portions 162 of the dicing lanes 71 are etched around each sensor of the wafers to match the existing upper portions of the dicing lanes 71. As shown in FIG. 25A, at this point the body portion 161 includes the sensor 10, 10' located thereon, and is coupled to a surrounding frame 166 by only the arm 73.

When it is desired to use the sensor, the carrier wafer 160 is removed (see FIGS. 26, 26A) by any of a number of methods, preferably by dissolving the bond between the carrier wafer 160 and the diaphragm wafer 52 in a solution of acetone or other appropriate chemicals. Next, the arm 73 is broken and the sensor 10, 10' is removed from the frame 166, such as by a suction probe. At this point, the sensor 10, 10' appears as sensor 10, 10' shown in FIGS. 1, 2, 4 and 5. External wires can then be coupled to each of the leads 32, 34, 36 of the sensor 10, 10', and the sensor can be immersed in the subject fluid, as described earlier, to operate the sensor and detect the pressure of the surrounding fluid. If desired, the exposed upper surfaces of the sensor 10, 10' may be coated with a passivation layer. For example, a biocompatible coating may be applied to the device, or an electronics passivation coating (such as silicon nitride) may be applied to shield the device from the ionic nature of in-vivo blood environments.

Figure 27:
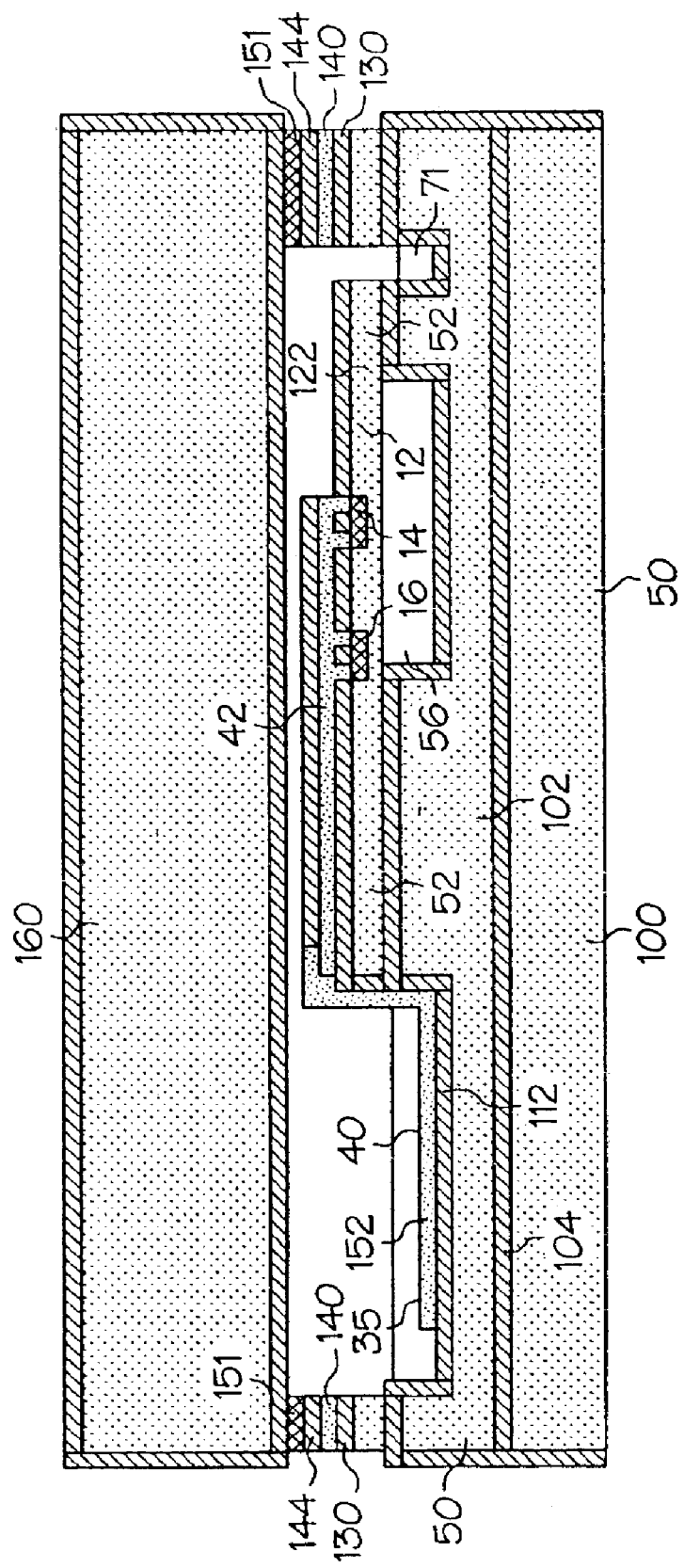

An alternate method for coupling the carrier wafer 160 to the diaphragm wafer 52 is shown in FIG. 27. In FIG. 27, the carrier wafer 160 is bonded to the upper passivation layer 144 and spacer portions 140 located on the diaphragm wafer, and the carrier wafer 160 remains spaced away from the body portion 161 of the sensor (i.e., does not contact the upper passivation layer 144 or the leads 32, 34, 36) and the carrier wafer 160 is only coupled to the frame 166. In this case the carrier wafer 160 is preferably attached to the diaphragm wafer 52 by frit bonding 151. The system of FIG. 27 is the processed similar to the processing steps shown in FIGS. 23–26 described above. In this embodiment the carrier wafer 160 provides the desired stiffness to the system but is not necessarily coupled to body 161 of the sensor or to the diaphragm wafer 52. In this manner, when it is desired to separate the sensor from the diaphragm wafer 52, the arm 73 needs only to be cut or removed, and it is not necessary to remove the carrier wafer 160. Thus, in this case the sensor 10, 10' can be diced and removed quickly and easily.

The use of the diaphragm wafer 52 and base wafer 50 provides significant advantages with respect to control of the dimensions and thickness of the sensor 10, 10'. For example, the thickness of the lower silicon layer 122 of the diaphragm wafer 52 determines the thickness of the diaphragm 12. Similarly, the thickness of the lower portion of the sensor 10, 10' is determined by the thickness of the upper silicon layer 102 of the base wafer 50.

In this manner, SOI wafers having the desired thicknesses of the upper and lower silicon layers can be accurately mass-produced by a manufacturer of SOI wafers. The manufactured SOI diaphragm wafer 52 can then be bonded to a SOI base wafer 50, and the upper silicon layer 120 of diaphragm wafer can be removed to thereby expose the lower silicon layer 122 of the desired thickness. Similarly, the lower silicon layer 100 of the base wafer 50 can easily be removed to leave behind the upper layer 102 of the desired thickness. The internal insulator layers of the wafers 50, 52 act as an etch stop for quick and easy removal of the appropriate layers.

DRIE is preferably used to define the outer edges of the sensor 10, 10'. In this manner, all of the outer dimensions of the sensor 10, 10' can be precisely and accurately defined. The sensor 10, 10' can be made quite thin using the manufacturing process of the present invention. For example, the sensor may be 70 microns thick, or even thinner, if desired. Thickness of 70 microns or less enables the sensor 10, 10' to have expanded utility in biological applications (for example, the sensor 10, 10' can be advanced into small vessels inside the body).

Furthermore, using the processing method of the present invention, CMOS or other multiplex electronics can be fabricated on the wafers 50, 52, which enables signals to and from the sensor 10, 10' to be processed and multiplexed on the same chip or wafer. For example, the use of CMOS electronics can enable the sensor to provide a buffered voltage signal as its output, reduce the sensitivity of the system to variances in the power supply, provide an increased output signal range, reduce power consumption, and provide greater linearity and accuracy of the sensor outputs.

Furthermore, the sensor of the present invention may include a single crystal silicon diaphragm. A single crystal silicon diaphragm is typically a highly uniform material which provides repeatable, consistent responses to apply pressure, and therefore is highly desirable as a diaphragm material. Furthermore, a single crystal silicon diaphragm yields uniform piezo resistors when the single crystal silicon is implanted with high energy atoms, which also increases the performance of the sensor.

The use of single crystal silicon in the system may also reduce sensitivity to package stresses. Because the diaphragm wafer is preferably silicon and the base wafer is preferably silicon, the diaphragm wafer 52 can be fusion silicon bonded 50 to the base wafer. Because FSB is a silicon-to-silicon bond, no thermal stresses are created at the bonding points because there is not junction of materials that have different coefficients of thermal expansion. Thus, because thermal stresses at the bonding points are eliminated, stresses in the system and in the diaphragm are reduced, which increases the accuracy of the sensor. Finally, because the final thinning of the system is one of the last steps in the manufacturing process, handling of the wafers in their thin state is minimized.

Having described the invention in detail and by reference to the preferred embodiments, it is to be understood that modifications and variations thereof are possible without departing from the scope of the invention.

What is claimed is:

1. A method for forming a sensor comprising the steps of:
   providing a base wafer;
   forming a sensor cavity in said base wafer;
   after said forming step, coupling a diaphragm wafer to said base wafer, said diaphragm wafer including a diaphragm portion, a sacrificial portion, and an insulating layer disposed between said diaphragm portion and said sacrificial portion, and wherein said diaphragm wafer is coupled to said base wafer such said diaphragm portion generally covers said sensor cavity;
   reducing a thickness of said diaphragm wafer by removing at least part of said sacrificial portion while using said insulating layer as an etch stop; and
   forming or locating at least one piezo resistive portion on said diaphragm portion.

2. The method of claim 1 wherein said diaphragm wafer is a silicon-on-insulator wafer including upper and lower silicon layers separated by said insulating layer, and wherein said upper silicon layer includes said sacrificial portion and said lower silicon layer includes said diaphragm portion, and wherein said reducing step includes removing substantially all of said upper silicon layer of said diaphragm wafer located over said sensor cavity.

3. The method of claim 1 wherein said coupling step includes coupling said diaphragm wafer to said base wafer by fusion silicon bonding.

4. The method of claim 1 further comprising the step of reducing the thickness of said base wafer.

5. The method of claim 4 wherein said base wafer is a silicon-on-insulator wafer including upper and lower silicon layers separated by an insulating layer, and wherein said reducing step of said base wafer includes removing said lower silicon layer of said base wafer.

6. The method of claim 1 wherein said base wafer and said diaphragm wafer are both silicon-on-insulator wafers.

7. The method of claim 1 wherein said forming or locating step includes bombarding at least a portion of said diaphragm wafer with high energy atoms using implantation methods.

8. The method of claim 1 further comprising the step of depositing at least two conductive leads on said diaphragm wafer, said leads being electrically coupled to said at least one piezo resistive portion.

9. The method of claim 8 further comprising the step of etching at least two grooves in said base wafer to form a surface for receiving an external wire therein, and wherein depositing step includes depositing said leads such that at least part of each lead is located in one of said grooves.

10. The method of claim 1 wherein said sensor cavity is generally circular in a top view.

11. The method of claim 1 wherein said sensor cavity forming step includes etching said sensor cavity using deep reactive ion etching.

12. The method of claim 1 further comprising the step of coupling a carrier wafer to said diaphragm wafer, etching a dicing lane around said sensor to release said sensor from said base wafer and diaphragm wafer, and removing said carrier wafer.

13. The method of claim 12 wherein said coupling step including bonding said carrier wafer to said diaphragm wafer, said etching step including etching using deep reactive ion etching.

14. The method of claim 12 wherein said sensor includes a body portion including said diaphragm portion and said at least one piezo resistive portion, and wherein said sensor includes a frame extending around said body portion, and wherein said carrier wafer is coupled to said frame and not coupled to said body portion during said coupling step.

15. The method of claim 12 further comprising the step of, before said coupling step, depositing a layer of conductive material on said diaphragm wafer to form at least two leads electrically coupled to said piezo resistive portion, and wherein at least part of said conductive material forms a spacer located adjacent an end of said sensor, and wherein said carrier wafer is located on top of said spacer during said coupling step.

16. The method of claim 1 further comprising the steps of etching a dicing lane in said diaphragm wafer and said base wafer to define a body portion having said sensor located thereon, a frame located around said body portion, and an arm extending between said frame and said body portion.

17. The method of claim 16 further comprising the step of separating said sensor from said diaphragm wafer by breaking arm to separate the body portion from said frame.

18. The method of claim 16 wherein said etching includes deep reactive ion etching.

19. The method of claim 1 wherein said sensor cavity forming step includes etching said sensor cavity and etching a trough in said base wafer using deep reactive ion etching, and wherein the method further includes the step of depositing or growing an insulating layer on said base wafer after said first forming step.

20. The method of claim 19 wherein said base wafer and said diaphragm wafers are both silicon-on-insulator wafers including upper and lower silicon layers separated by an insulating layer, and wherein the method further includes the step of removing said upper silicon layer and said insulating layer of said diaphragm wafer, and bombarding selected portions of said lower silicon layer of said diaphragm wafer with high energy atoms to form said at least one piezo resistive portion.

21. The method of claim 20 further comprising the steps of depositing a passivation layer on said diaphragm wafer, etching said passivation layer to expose at least part of said at least one piezo resistive portion, and depositing a conductive material on said diaphragm wafer such that at least part of said conductive material contacts said exposed part of said at least one piezo resistive portion.

22. The method of claim 21 further comprising the step of removing any portions of said diaphragm wafer located over said trough, and forming at least two grooves in said trough.

23. The method of claim 22 further comprising the step of depositing an auxiliary passivation layer on said diaphragm wafer coating said conductive material, etching said auxiliary passivation layer to at least partially expose said conductive material, and depositing an auxiliary layer of conductive material on said sensor such that said auxiliary layer of conductive material contacts said conductive material, and such that at least part of said auxiliary layer of conductive material is located in each of said grooves.

24. The method of claim 1 wherein said diaphragm wafer is coupled to said base wafer such that said sensor cavity is sealed between and located between said diaphragm portion and said base wafer.

25. A method for forming a sensor comprising the steps of:
providing a base wafer;
etching a sensor cavity in said base wafer;
providing a silicon-on-insulator diaphragm wafer including upper and lower silicon layers separated by an insulating layer;
coupling said diaphragm wafer to said base wafer such that a diaphragm portion of said diaphragm wafer is located over said sensor cavity;
etching said base wafer to reduce a thickness of said base wafer;
removing at least said upper silicon layer of said diaphragm wafer to reduce a thickness of said diaphragm portion; and
depositing at least one piezo resistor on said diaphragm portion.

26. A method for forming a sensor comprising the steps of:
providing a base wafer;
forming a sensor cavity in said base wafer;
coupling a diaphragm wafer to said base wafer such that a diaphragm portion of said diaphragm wafer is located over said sensor cavity;
reducing a thickness of said base wafer; and
forming or locating at least one piezo resistive portion on said diaphragm portion, wherein said base wafer includes an upper layer, a lower layer, and an insulating layer disposed between said upper layer and said lower layer, and wherein said reducing step includes removing said lower layer of said base wafer while using said insulating layer as an etch stop.

27. The method of claim 26 wherein said base wafer is a silicon-on-insulator wafer, said upper and lower portions are silicon, and wherein said insulating layer is an oxide.

28. A method for forming a sensor comprising the steps of:

providing a silicon base wafer;

forming a sensor cavity in said base wafer;

coupling a silicon diaphragm wafer to said base wafer by fusion silicon bonding, said diaphragm wafer including a diaphragm portion, at least one of said base wafer or said diaphragm wafer being a silicon-on-insulator wafer having an upper silicon layer, a lower silicon layer and an insulating layer disposed therebetween, and wherein said diaphragm wafer is coupled to said base wafer such that said diaphragm portion generally covers said sensor cavity; and forming or locating at least one piezo resistive portion on said diaphragm portion.

29. The method of claim 28 further comprising the step of reducing the thickness of said silicon-on-insulator wafer by removing one of said upper or lower layers while using said insulating layer as an etch stop.

30. A method for forming a sensor comprising the steps of:

providing a base wafer which is a semiconductor-on-insulator wafer;

forming a sensor cavity in said base wafer;

coupling a diaphragm wafer to said base wafer, said diaphragm wafer being a semiconductor-on-insulator wafer and including a diaphragm semiconductor portion, a sacrificial semiconductor portion, and an insulating layer disposed between said diaphragm portion and said sacrificial portion, and wherein said diaphragm wafer is coupled to said base wafer such said diaphragm portion generally covers said sensor cavity;

reducing a thickness of said diaphragm wafer by removing at least part of said sacrificial portion while using said insulating layer as an etch stop; and forming or locating at least one piezo resistive portion on said diaphragm portion.

31. The method of claim 30 wherein each of said semiconductor-on-insulator wafers includes an upper semiconductor layer, a lower semiconductor layer and an insulating layer located between said upper and lower semiconductor layers.

32. The method of claim 31 wherein both of said semiconductor-on-insulator wafers are silicon-on-insulator wafers.

* * * * *